United States Patent
Tamura

(10) Patent No.: US 9,866,083 B2
(45) Date of Patent: Jan. 9, 2018

(54) STATOR FOR ROTATING ELECTRIC MACHINE

(71) Applicant: DENSO CORPORATION, Kariya, Aichi-pref. (JP)

(72) Inventor: Akito Tamura, Anjo (JP)

(73) Assignee: DENSO CORPORATION, Kariya (JP)

( * ) Notice: Subject to any disclaimer, the term of this patent is extended or adjusted under 35 U.S.C. 154(b) by 389 days.

(21) Appl. No.: 14/751,924

(22) Filed: Jun. 26, 2015

(65) Prior Publication Data

US 2015/0381000 A1 Dec. 31, 2015

(30) Foreign Application Priority Data

Jun. 27, 2014 (JP) ................................. 2014-133272

(51) Int. Cl.
*H02K 3/28* (2006.01)
*H02K 3/12* (2006.01)

(52) U.S. Cl.
CPC ..................... *H02K 3/28* (2013.01); *H02K 3/12* (2013.01)

(58) Field of Classification Search
CPC .. H02K 3/12; H02K 3/28; H02K 3/30; H02K 3/34; H02K 3/345; H02K 3/50
See application file for complete search history.

(56) References Cited

U.S. PATENT DOCUMENTS

| 5,442,250 | A | * | 8/1995 | Stridsberg | ............ | B60K 7/0007 310/185 |
| 7,557,483 | B2 | * | 7/2009 | Yasuhara | .................. | H02K 3/28 310/184 |
| 2006/0152188 | A1 | * | 7/2006 | Yasuhara | .................. | H02K 3/28 318/727 |
| 2010/0141078 | A1 | | 6/2010 | Kouda et al. | | |
| 2011/0043069 | A1 | | 2/2011 | Tanaka et al. | | |
| 2011/0309785 | A1 | * | 12/2011 | Fargo | ....................... | H02K 3/28 318/773 |
| 2012/0007462 | A1 | | 1/2012 | Kouda et al. | | |
| 2012/0248924 | A1 | | 10/2012 | Tanaka et al. | | |

(Continued)

FOREIGN PATENT DOCUMENTS

JP 2009-112186 A 5/2009
JP 2011-045193 A 3/2011

(Continued)

*Primary Examiner* — Tran Nguyen
(74) *Attorney, Agent, or Firm* — Oliff PLC

(57) ABSTRACT

A stator includes an annular stator core and a stator coil. The stator core has U-phase slots, V-phase slots and W-phase slots sequentially and repeatedly provided in pairs in its circumferential direction. The stator coil has U-phase, V-phase and W-phase windings respectively received in the U-phase, V-phase and W-phase slots. In each of the slots, there are received 2×N in-slot portions of a corresponding one of the phase windings in radial alignment with each other, where N≥2. Each of the phase windings consists of a pair of sub-windings connected parallel to each other. Each of the sub-windings includes winding sections that are classified into N winding section groups. Each of the winding sections of (N−1) winding section groups is connected via only serial connection, and each of the winding sections of the remaining one winding section group is connected via both serial connection and parallel connection.

4 Claims, 19 Drawing Sheets

(56) References Cited

U.S. PATENT DOCUMENTS

2013/0076188 A1\* 3/2013 Ikeda ................. H02K 3/28
                                                              310/195
2015/0076953 A1   3/2015 Tamura

FOREIGN PATENT DOCUMENTS

| JP | 2012217293 A | \* | 11/2012 | ............... H02K 3/28 |
| JP | 2012222962 A | \* | 11/2012 | |
| JP | 2015-084635 A | | 4/2015 | |

\* cited by examiner

1ST WINDING SECTION A1

2ND WINDING SECTION B1

3RD WINDING SECTION C1

4TH WINDING SECTION D1

1ST WINDING SECTION A1

2ND WINDING SECTION B1 (B1-1, B1-2)

3RD WINDING SECTION C1 (C1-1, C1-2)

4TH WINDING SECTION D1

STATOR FOR ROTATING ELECTRIC MACHINE

CROSS-REFERENCE TO RELATED APPLICATION

This application is based on and claims priority from Japanese Patent Application No. 2014-133272 filed on Jun. 27, 2014, the content of which is hereby incorporated by reference in its entirety into this application.

BACKGROUND

1. Technical Field

The present invention relates to stators for rotating electric machines that are used in, for example, motor vehicles as electric motors and electric generators.

2. Description of Related Art

Conventionally, there have been known rotating electric machines which are designed to be used in, for example, motor vehicles and include a rotor and a stator. The rotor is rotatably arranged in the rotating electric machine. The stator includes a stator core and a stator coil. The stator core is disposed in radial opposition to the rotor and has a plurality of slots arranged in a circumferential direction of the stator core. The stator coil is comprised of a plurality of phase windings each of which is mounted on the stator core so as to be received in corresponding slots of the stator core.

In such rotating electric machines as described above, the magnetomotive force of the stator, which functions as an armature, depends on electric current flowing in each phase winding of the stator coil and the number of turns of each phase winding. Therefore, the magnetomotive force of the stator can represent characteristics of the rotating electric machine in relation to the relationship between the torque and rotational speed of the machine. In addition, for each phase winding of the stator coil, the number T of turns of the phase winding can be calculated by the following equation: T=A'/A, where A is the electric current at an input terminal of the phase winding, and A' is the electric current inputted for each pole. For example, in the case of 4T (i.e., the number T of turns is equal to 4), the torque is kept at a certain high level in a low-speed region, and gradually decreased with increase in the speed. Moreover, in the case of 2T (i.e., the number T of turns is equal to 2), the torque in a low-speed region is about half that in the case of 4T; the width of the low-speed region in which the torque is kept at a certain level is about twice that in the case of 4T; the decrease in the torque in a high-speed region is considerably less than that in the case of 4T; and the torque in the high-speed region is kept at a higher level than that in the case of 4T.

On the other hand, there have been also known segment-type stator coils which are formed by: inserting a plurality of electric conductor segments into slots of a stator core from one axial side of the stator core; and joining each corresponding pair of those ends of the electric conductor segments which protrude from the slots of the stator core on the other axial side of the stator core. In such segment-type stator coils, due to the above manner of forming them, the number of in-slot portions of the electric conductor segments received in each slot of the stator core is generally limited to an even number; and thus the number T of turns of each phase winding is also generally limited to an even number. Consequently, it is generally impossible to obtain a segment-type stator coil which has the characteristics of, for example, 3T between 4T and 2T; with the characteristics of 3T, the torque could be kept moderately high both in a low-speed region and in a high-speed region.

To solve the above problem, Japanese Patent Application Publication No. JP2011045193A (to be referred to as Patent Document 1 hereinafter) discloses a stator coil which has the characteristics of 3T realized by a Δ-Y connection. Specifically, the stator coil is comprised of first and second winding groups. The stator coil is wound around a stator core in a concentrated winding manner so that the phase difference in electrical angle between each corresponding pair of windings of the first and second winding groups is equal to π/6. Moreover, an X-phase winding, a Y-phase winding and a Z-phase winding of the first winding group are Δ-connected to define three terminals therebetween. Further, a U-phase winding, a V-phase winding and a W-phase winding of the second winding group are Y-connected so as to be respectively connected to the three terminals defined between the X-phase, Y-phase and W-phase windings of the first winding group. Consequently, all of the X-phase, Y-phase and W-phase windings of the first winding group and the U-phase, V-phase and W-phase windings of the second winding group together foam a Δ-Y connection (i.e., a combination of a Δ connection and a Y connection).

Japanese Patent Application Publication No. JP2009112186A (to be referred to as Patent Document 2 hereinafter) discloses a stator coil which is formed of a plurality of continuous electric conductor wires and has the characteristics of 3T realized by connecting two Y connections parallel to each other.

However, the stator coil disclosed in Patent Document 1 involves a problem that circulating current flows within the Δ connection formed of the X-phase, Y-phase and W-phase windings of the first winding group, thereby increasing electrical loss in a high-speed region. On the other hand, the stator coil disclosed in Patent Document 2 involves a problem that circulating current may be generated at portions of the stator coil where the two Y connections are connected parallel to each other, thereby increasing electrical loss.

SUMMARY

According to exemplary embodiments, there is provided a stator for a rotating electric machine. The stator includes an annular stator core and a stator coil. The stator core has a plurality of pairs of first-phase slots, a plurality of pairs of second-phase slots and a plurality of pairs of third-phase slots that are sequentially and repeatedly provided in a circumferential direction of the stator core. The stator coil is comprised of a first-phase winding, a second-phase winding and a third-phase winding that are mounted on the stator core so as to be respectively received in the pairs of first-phase slots, the pairs of second-phase slots and the pairs of third-phase slots. The first-phase, second-phase and third-phase windings are Y-connected with each other. Moreover, in each of the first-phase, second-phase and third-phase slots of the stator core, there are received 2×N in-slot portions of a corresponding one of the first-phase, second-phase and third-phase windings of the stator coil in radial alignment with each other, where N is a natural number not less than 2. Each of the first-phase, second-phase and third-phase windings of the stator coil is comprised of a pair of sub-windings that are connected parallel to each other. Each of the sub-windings is comprised of a plurality of winding sections. The winding sections are classified into N winding section groups including a first winding section group and a second winding section group. Each of the winding sections of the first winding section group is arranged alternately at first and second layers in the corresponding phase slots of the stator core. Each of the winding sections of the second winding section group is arranged alternately at third and fourth layers in the corresponding phase slots of the stator core. Among the N winding section groups, each of the winding sections of (N−1) winding section groups is connected via only serial connection in the sub-winding, and each of the winding sections of the remaining one winding section group is connected via both serial connection and parallel connection in the sub-winding.

With the above configuration, the stator coil has the characteristics of kT, where k is an odd number not less than 3. Moreover, since the first-phase, second-phase and third-phase windings are Y-connected (i.e., not Δ-connected), circulating current is prevented from being generated in the stator coil.

In further implementations, each of those winding sections which are connected via only serial connection in the sub-winding has a first cross-sectional area. Each of those winding sections which are connected via both serial connection and parallel connection in the sub-winding has a second cross-sectional area. The second cross-sectional area is preferably set to be substantially half the first cross-sectional area.

Each of the pairs of first-phase slots consists of a first first-phase slot and a second first-phase slot. Each of the pairs of second-phase slots consists of a first second-phase slot and a second second-phase slot. Each of the pairs of third-phase slots consists of a first third-phase slot and a second third-phase slot. Each of the sub-windings of the first-phase winding is preferably equally arranged in the first first-phase slots and the second first-phase slots. Each of the sub-windings of the second-phase winding is preferably equally arranged in the first second-phase slots and the second second-phase slots. Each of the sub-windings of the third-phase winding is preferably equally arranged in the first third-phase slots and the second third-phase slots.

Further, each of those winding sections of the sub-windings of the first-phase winding which are connected via both serial connection and parallel connection is preferably equally arranged in the first first-phase slots and the second first-phase slots. Each of those winding sections of the sub-windings of the second-phase winding which are connected via both serial connection and parallel connection is preferably equally arranged in the first second-phase slots and the second second-phase slots. Each of those winding sections of the sub-windings of the third-phase winding which are connected via both serial connection and parallel connection is preferably equally arranged in the first third-phase slots and the second third-phase slots.

BRIEF DESCRIPTION OF THE DRAWINGS

The present invention will be understood more fully from the detailed description given hereinafter and from the accompanying drawings of exemplary embodiments, which, however, should not be taken to limit the present invention to the specific embodiments but are for the purpose of explanation and understanding only.

In the accompanying drawings.

DESCRIPTION OF EMBODIMENTS

Figure 1:
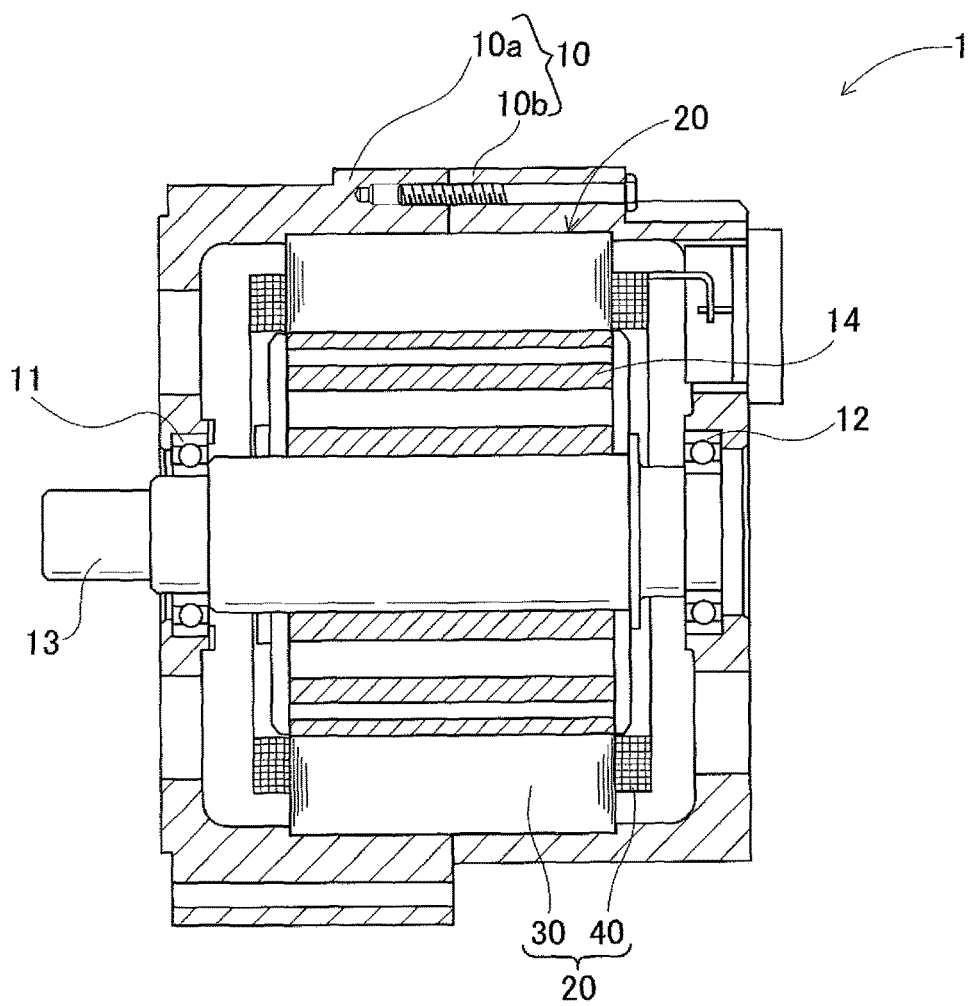
FIG. 1 is a schematic cross-sectional view of a rotating electric machine which includes a stator according to a first embodiment.

Exemplary embodiments will be described hereinafter with reference to FIGS. 1-34. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

First Embodiment

FIG. 1 shows the overall configuration of a rotating electric machine 1 which includes a stator 20 according to a first embodiment. The rotating electric machine 1 is designed to be used in a motor vehicle to function as an electric motor.

As shown in FIG. 1, the rotating electric machine 1 further includes a housing 10 and a rotor 14 in addition to the stator 20. The housing 10 is comprised of a pair of substantially cup-shaped housing pieces 10a and 10b which are jointed together at the open ends thereof. The housing 10 has a pair of bearings 11 and 12 mounted therein, via which a rotating shaft 13 is rotatably supported by the housing 10. The rotor 14 is received in the housing 10 and fixed on the rotating shaft 13. The stator 20 is fixed in the housing 10 so as to surround the radially outer periphery of the rotor 14.

The rotor 14 includes a plurality of permanent magnets that are embedded at predetermined positions in the rotor 14. The permanent magnets form a plurality of pairs of N and S magnetic poles on the radially outer periphery of the rotor 14 to face the radially inner periphery of the stator 20. The magnetic poles are spaced from one another at a predetermined pitch in the circumferential direction of the rotor 14. Further, the polarities of the magnetic poles alternate between north (N) and south (S) in the circumferential direction. In addition, the number of the magnetic poles can be suitably set according to the design specification of the rotating electric machine 1. For example, in the present embodiment, the number of the magnetic poles is set to be equal to eight (i.e., four N poles and four S poles).

Figure 2:
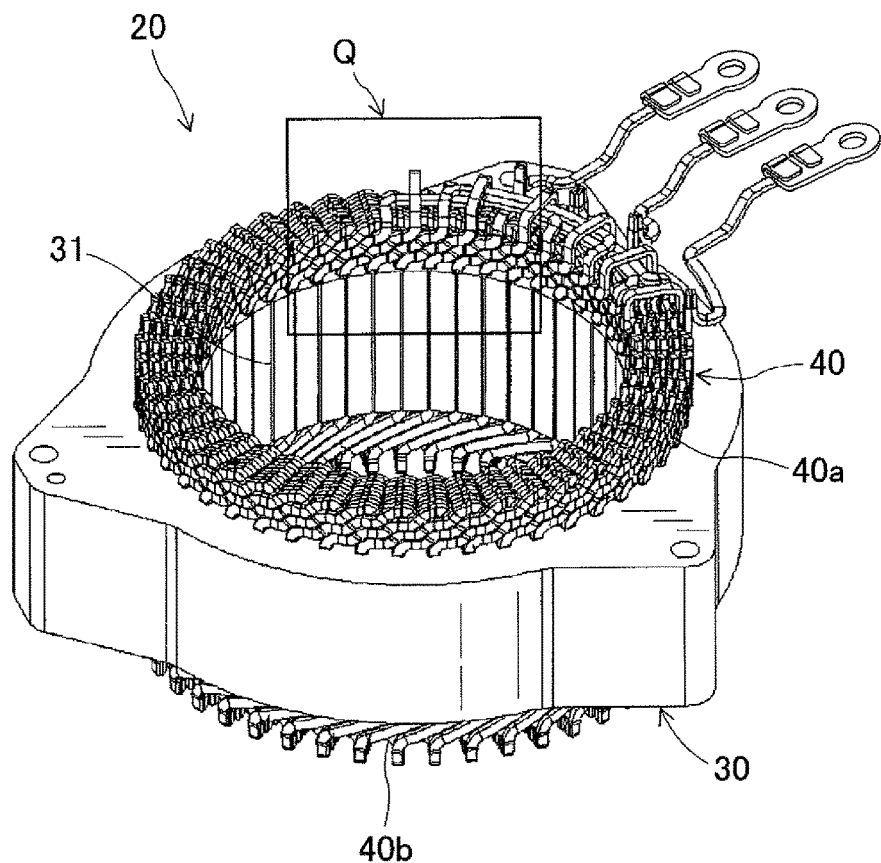
FIG. 2 is a perspective view of the stator according to the first embodiment.

Referring now to FIG. 2, the stator 20 includes an annular (or hollow cylindrical) stator core 30 and a three-phase stator coil 40 that is comprised of a U-phase winding, a V-phase winding and a W-phase winding.

The stator core 30 is formed by, for example, laminating a plurality of annular magnetic steel sheets in the axial direction of the stator core 30. The stator core 30 has an annular back core portion and a plurality of stator teeth that protrude from the back core portion radially inward and are spaced from one another at a predetermined pitch in the circumferential direction of the stator core 30. Between each circumferentially-adjacent pair of the stator teeth, there is formed one slot 31. That is, the stator core 30 has a plurality of slots 31 that are formed in a radially inner surface of the stator core 30 and spaced from one another at a predetermined pitch in the circumferential direction of the stator core 30. Each of the slots 31 extends in the axial direction of the stator core 30 so as to penetrate the stator core 30 in the axial direction and has a substantially rectangular cross winding section perpendicular to the axial direction (see FIG. 11). For each of the slots 31, the depth direction of the slot 31 is coincident with a radial direction of the stator core 30.

In the present embodiment, the slot multiplier number is set to, for example, 2. That is, there are provided two slots 31 per magnetic pole of the rotor 14 that has the eight magnetic poles and per phase of the three-phase stator coil 40. Accordingly, the total number of the slots 31 provided in the stator core 30 is equal to 48 (i.e., 2×8×3).

Figure 3:
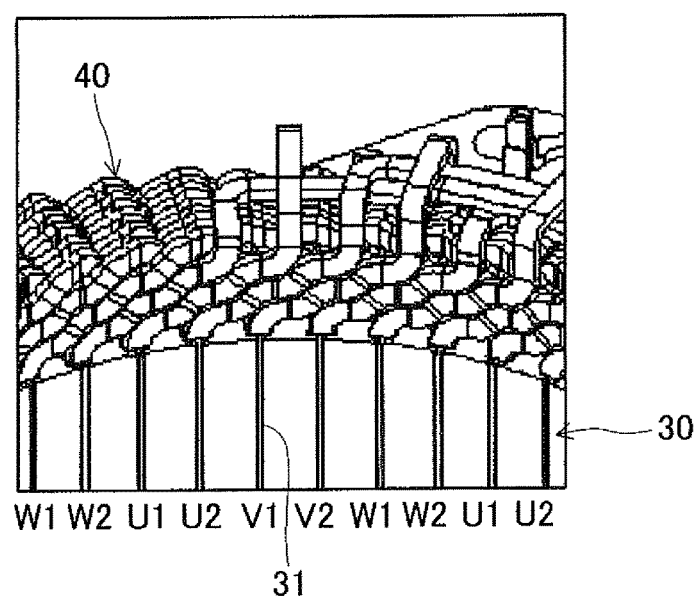
FIG. 3 is an enlarged view of a part Q of FIG. 2.

More specifically, in the present embodiment, per magnetic pole of the rotor 14, there are provided a circumferentially-adjacent pair of U-phase slots (U1, U2) in which only the U-phase winding of the stator coil 40 is received, a circumferentially-adjacent pair of V-phase slots (V1, V2) in which only the V-phase winding of the stator coil 40 is received, and a circumferentially-adjacent pair of W-phase slots (W1, W2) in which only the W-phase winding of the stator coil 40 is received. That is, the total of 48 slots 31 of the stator core 30 are comprised of the U-phase slots (U1, U2), the V-phase slots (V1, V2) and the W-phase slots (W1, W2) that are sequentially and repeatedly provided in pairs in the circumferential direction of the stator core 30, as shown in FIG. 3.

The stator coil 40 is formed of a plurality of substantially U-shaped electric conductor segments. Each of the electric conductor segments has a pair of straight portions that extend parallel to each other and a turn portion that connects ends of the straight portions on the same side. The electric conductor segments are obtained by processing (e.g., cutting and bending) a rectangular electric wire. The electric wire includes an electric conductor having a rectangular cross winding section and an insulating coat that covers the outer surface of the electric conductor.

Figure 11:
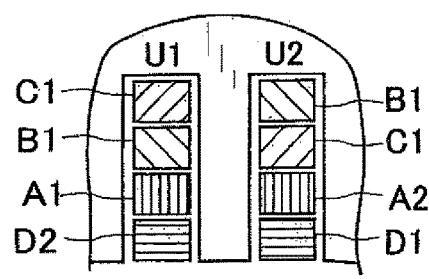
FIG. 11 is a schematic cross-sectional view of part of the stator according to the first embodiment, the part including a pair of U-phase slots of the stator core of the stator.

More specifically, the stator coil 40 is formed by: (1) inserting the substantially U-shaped electric conductor segments into the slots 31 of the stator core 30 from one axial side (i.e., the upper side in FIG. 2) of the stator core 30; (2) twisting, for each of the electric conductor segments, free end parts of the straight portions of the electric conductor segment, which protrude from the slots 31 on the other axial side (i.e., the lower side in FIG. 2) of the stator core 30, respectively toward opposite circumferential sides; and (3) joining each corresponding pair of the free end parts of the electric conductor segments by, for example, welding. Consequently, all the electric conductor segments are electrically connected in a predetermined pattern. In addition, those parts of the straight portions of the electric conductor segments which are received in the slots 31 of the stator core 30 constitute in-slot portions of the stator coil 40. In the present embodiment, as shown in FIG. 11, in each of the slots 31 of the stator core 30, there are received four (i.e., 2×N with N being equal to 2) in-slot portions of the stator coil 40 in radial alignment with each other.

Moreover, as shown in FIG. 2, the stator coil 40 has a first coil end part 40a protruding from one axial end face (i.e., the upper end face in FIG. 2) of the stator core 30 and a second coil end part 40b protruding from the other axial end face (i.e., the lower end face in FIG. 2) of the stator core 30. The first coil end part 40a is constituted of all the turn portions of the electric conductor segments. On the other hand, the second coil end part 40b is constituted of all of the free end parts of the straight portions of the electric conductor segments and the joints formed between the free end parts.

In the present embodiment, the stator coil 40 is configured to have the characteristics of 3T between 4T and 2T.

Figure 4:
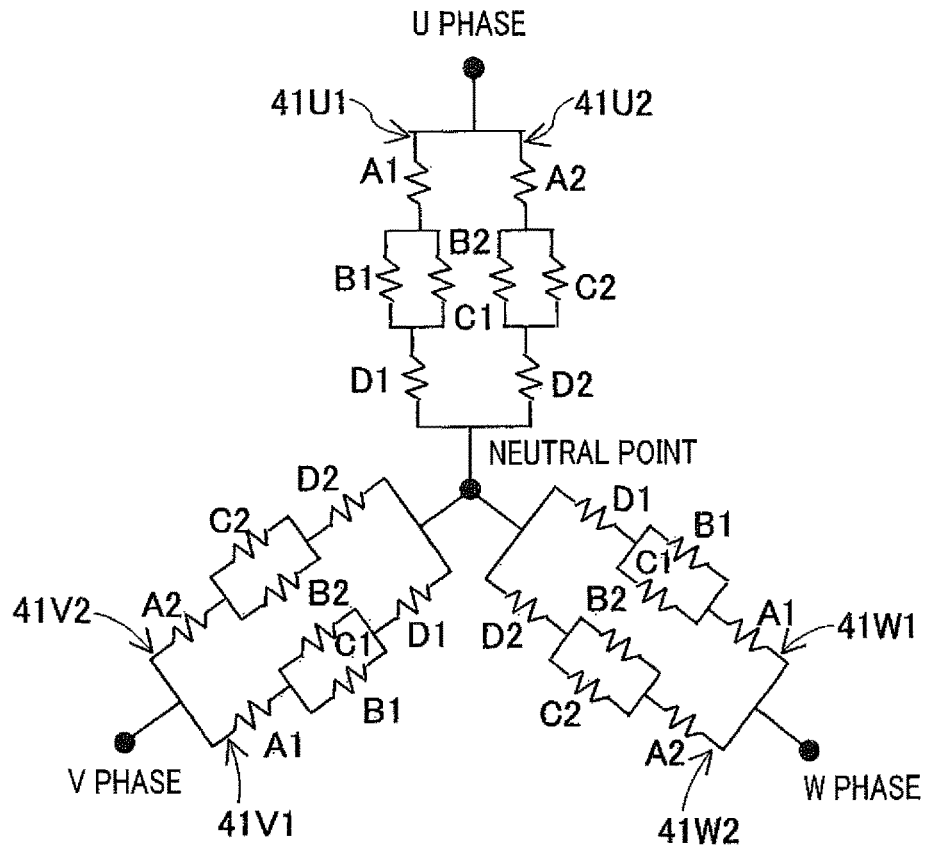
FIG. 4 is a schematic connection diagram of a stator coil of the stator according to the first embodiment.

Specifically, as shown in FIG. 4, the U-phase, V-phase and W-phase windings of the stator coil 40 are Y-connected (or star-connected). Moreover, each of the U-phase, V-phase and W-phase windings of the stator coil 40 is comprised of a pair of sub-windings that are connected parallel to each other.

More specifically, the U-phase winding is comprised of first and second sub-windings 41U1 and 41U2 that are connected parallel to each other. The V-phase winding is comprised of first and second sub-windings 41V1 and 41V2 that are connected parallel to each other. The W-phase winding is comprised of first and second sub-windings 41W1 and 41W2 that are connected parallel to each other.

In addition, the U-phase, V-phase and W-phase windings have the same configuration and differ from each other only in electrical phase. Therefore, for the sake of avoiding redundancy, only the U-phase winding will be described in detail hereinafter.

Figure 5:
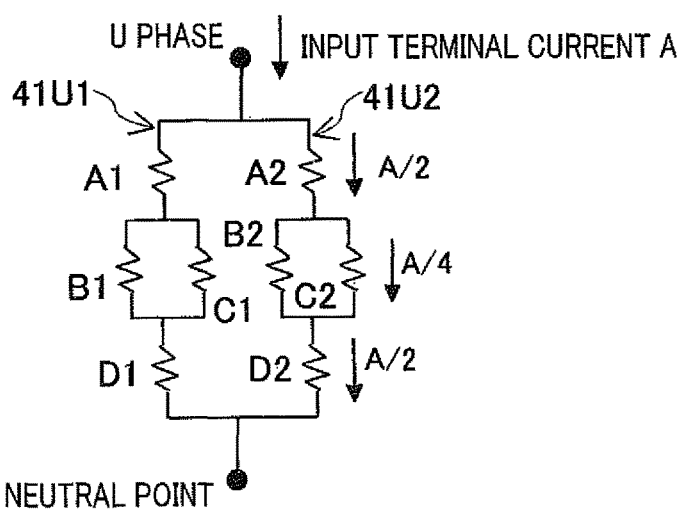
FIG. 5 is an enlarged view of a part of FIG. 4 which represents a U-phase winding of the stator coil.

As shown in FIG. 5, each of the first and second sub-windings 41U1 and 41U2 of the U-phase winding includes first to fourth winding sections. Moreover, the second and third winding sections are connected parallel to each other. The first winding section is arranged upstream of and serially connected to the parallel connection of the second and third winding sections, while the fourth winding section is arranged downstream of and serially connected to the parallel connection.

More specifically, the first sub-winding 41U1 includes the first to the fourth winding sections A1, B1, C1 and D1. The second and third winding sections B1 and C1 are connected parallel to each other. The first winding section A1 is arranged upstream of and serially connected to the parallel connection of the second and third winding sections B1 and C1, while the fourth winding section D1 is arranged downstream of and serially connected to the parallel connection. Similarly, the second sub-winding 41U2 includes the first to the fourth winding sections A2, B2, C2 and D2. The second and third winding sections B2 and C2 are connected parallel to each other. The first winding section A2 is arranged upstream of and serially connected to the parallel connection of the second and third winding sections B2 and C2, while the fourth winding section D2 is arranged downstream of and serially connected to the parallel connection.

Figure 6:
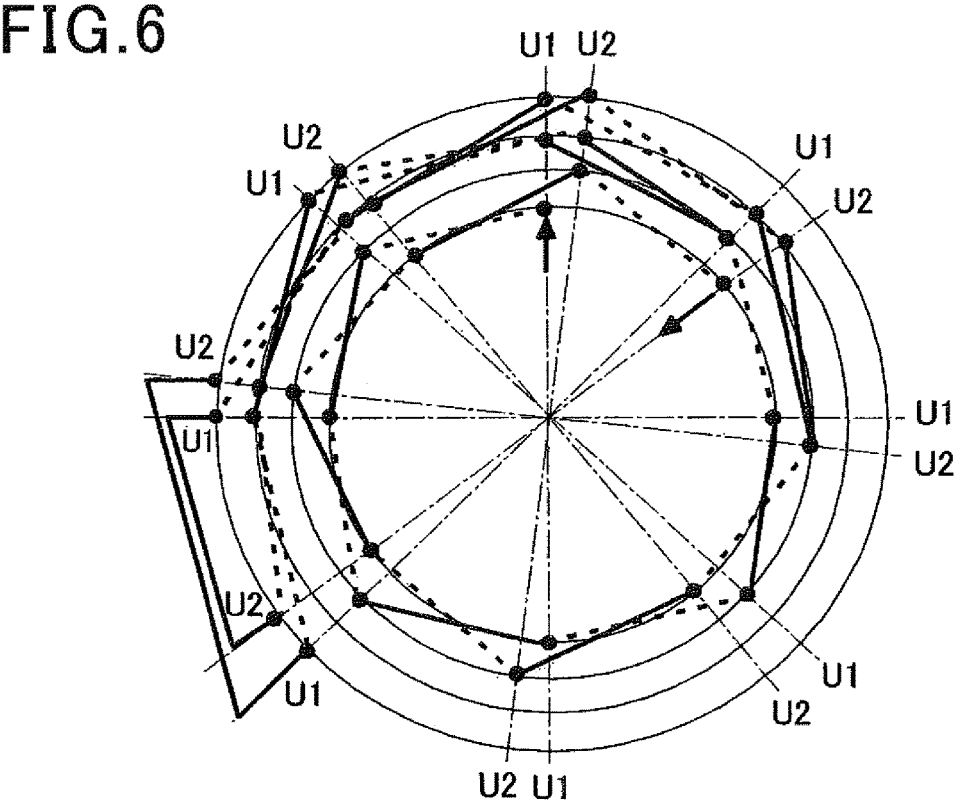
FIG. 6 is a schematic diagram illustrating all the positions of in-slot portions of a first sub-winding of the U-phase winding in the stator according to the first embodiment, the in-slot portions being received in corresponding slots of a stator core of the stator.
Figure 7:
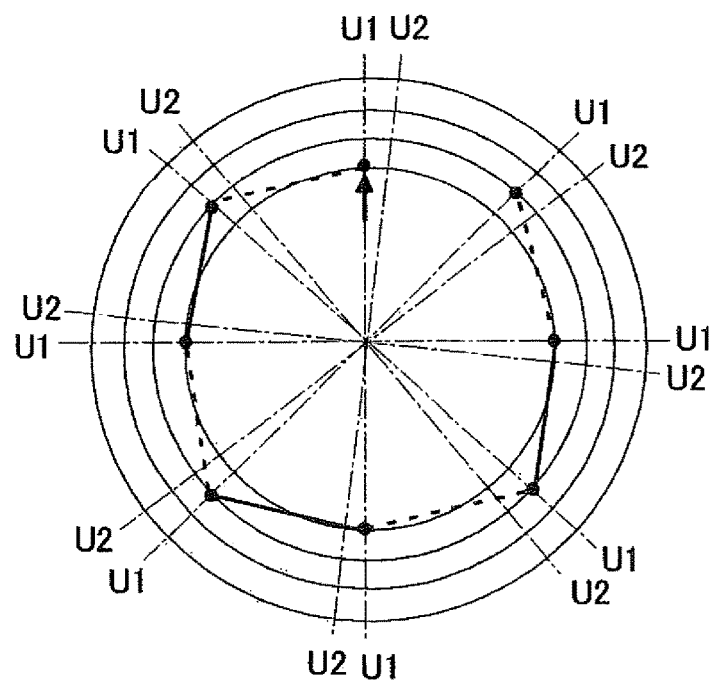
FIG. 7 is a schematic diagram illustrating only the positions of the in-slot portions of a first winding section A1 of the first sub-winding shown in FIG. 6.
Figure 8:
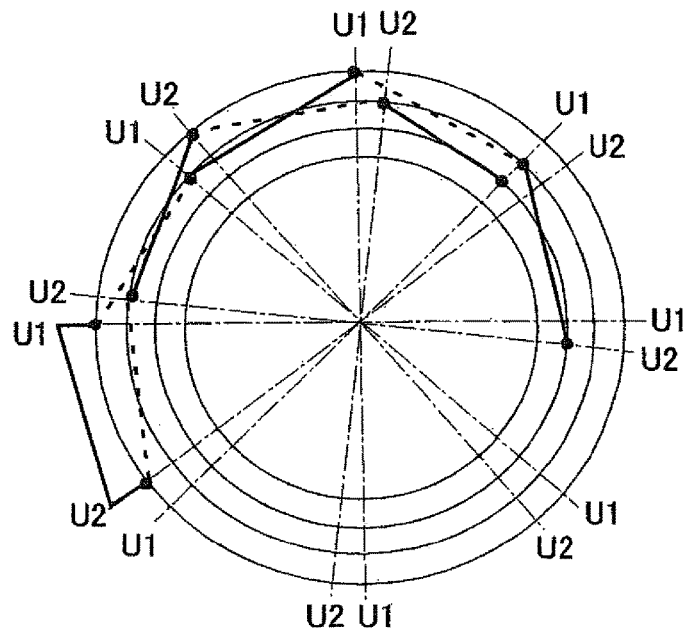
FIG. 8 is a schematic diagram illustrating only the positions of the in-slot portions of a second winding section B1 of the first sub-winding shown in FIG. 6.
Figure 9:
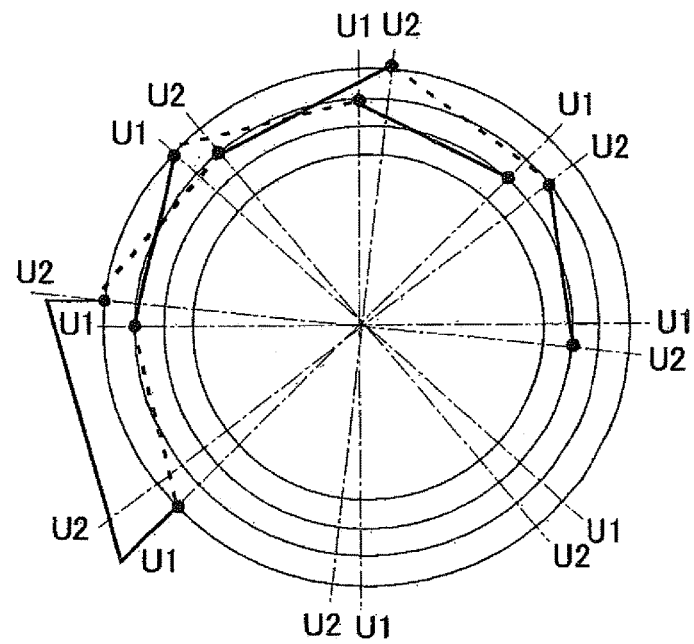
FIG. 9 is a schematic diagram illustrating only the positions of the in-slot portions of a third winding section C1 of the first sub-winding shown in FIG. 6.
Figure 10:
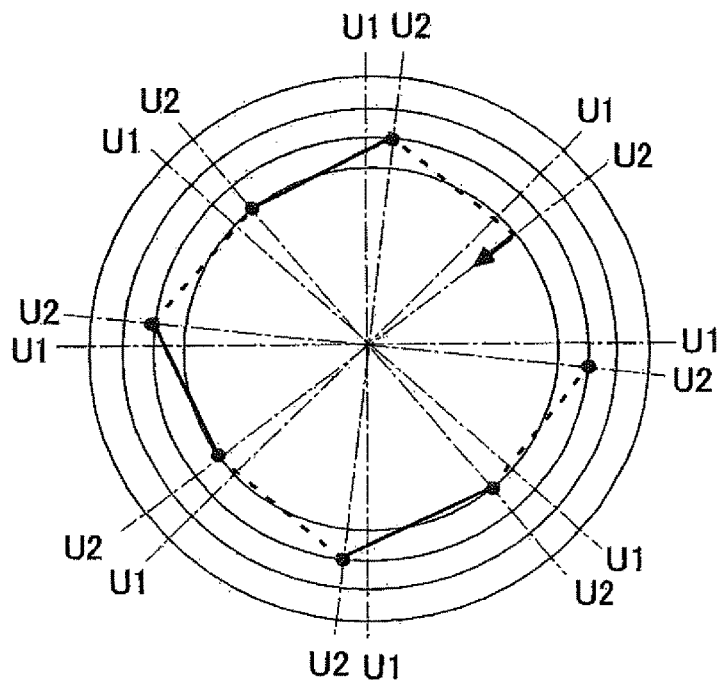
FIG. 10 is a schematic diagram illustrating only the positions of the in-slot portions of a fourth winding section D1 of the first sub-winding shown in FIG. 6.

FIG. 6 illustrates all the positions of the in-slot portions of the first sub-winding 41U1 of the U-phase winding. As described previously, the in-slot portions of the first sub-winding 41U1 are received in the U-phase slots U1 and U2 of the stator core 30. Moreover, for the sake of ease of understanding, FIG. 7 illustrates only the positions of the in-slot portions of the first winding section A1 of the first sub-winding 41U1; FIG. 8 illustrates only the positions of the in-slot portions of the second winding section B1 of the first sub-winding 41U1; FIG. 9 illustrates only the positions of the in-slot portions of the third winding section C1 of the first sub-winding 41U1; and FIG. 10 illustrates only the positions of the in-slot portions of the fourth winding section D1 of the first sub-winding 41U1. In addition, in FIGS. 6-10, the connections between the in-slot portions on the first coil end part 40a side are shown with continuous lines; and the connections between the in-slot portions on the second coil end part 40b side are shown with dashed lines.

As described previously, in the present embodiment, the in-slot portions of the stator coil 40 are radially stacked in four layers in each of the slots 31 of the stator core 30. Hereinafter, for the sake of convenience of explanation, the four layers will be sequentially referred to as the first, second, third and fourth layers from the side of the radially inner periphery of the stator core 30. Moreover, for each of the first to the fourth winding sections A1-D1 of the first sub-winding 41U1, the in-slot portions of the winding section will be sequentially referred to as the first in-slot portion, the second in-slot portion, . . . , and so on from the winding start end to the winding finish end of the winding section.

As shown in FIG. 7, the first winding section A1 of the first sub-winding 41U1 has eight in-slot portions. The first in-slot portion is arranged at the first layer in the U-phase slot U1 at the position of twelve o'clock. The second in-slot portion is arranged at the second layer in the U-phase slot U1 that is separated counterclockwise by six slots from the U-phase slot U1 in which the previous (i.e., the first) in-slot portion is received. The third to the eighth in-slot portions are arranged alternately at the first and second layers in the U-phase slots U1 that are successively separated counter-clockwise by six slots from the respective U-phase slots U1 in which the previous in-slot portions are received. Consequently, the eighth in-slot portion is arranged at the second layer in the U-phase slot U1 at the position of half past one o'clock.

As shown in FIG. 8, the second winding section B1 of the first sub-winding 41U1 also has eight in-slot portions. The first in-slot portion is arranged at the third layer in the U-phase slot U2 that is separated counterclockwise by five slots from the U-phase slot U1 at the position of half past one o'clock. In addition, the first in-slot portion of the second winding section B1 is connected to the eighth in-slot portion of the first winding section A1 which is arranged at the second layer in the U-phase slot U1 at the position of half past one o'clock. The second to the fourth in-slot portions of the second winding section B1 are arranged alternately at the fourth and third layers in the U-phase slots U2 that are successively separated counterclockwise by six slots from the respective U-phase slots U2 in which the previous in-slot portions are received. Consequently, the fourth in-slot portion is arranged at the fourth layer in the U-phase slot U2 at the position of half past seven o'clock. Further, the fifth in-slot portion is arranged at the fourth layer in the U-phase slot U1 that is separated clockwise by five slots from the U-phase slot U2 at the position of half past seven o'clock. That is, the bridging (or connection) between the fourth and fifth in-slot portions is an outermost layer-to-outermost layer bridging. The sixth to the eighth in-slot portions are arranged alternately at the third and fourth layers in the U-phase slots U1 that are successively separated clockwise by sixth slots from the respective U-phase slots U1 in which the previous in-slot portions are received. Consequently, the eighth in-slot portion is arranged at the third layer in the U-phase slot U1 at the position of half past one o'clock.

As shown in FIG. 9, the third winding section C1 of the first sub-winding 41U1 also has eight in-slot portions. The first in-slot portion is arranged at the third layer in the U-phase slot U1 that is separated counterclockwise by six slots from the U-phase slot U1 at the position of half past one o'clock. In addition, the first in-slot portion of the third winding section C1 is also connected to the eighth in-slot portion of the first winding section A1 which is arranged at the second layer in the U-phase slot U1 at the position of half past one o'clock. The second to the fourth in-slot portions of the third winding section C1 are arranged alternately at the fourth and third layers in the U-phase slots U1 that are successively separated counterclockwise by six slots from the respective U-phase slots U1 in which the previous in-slot portions are received. Consequently, the fourth in-slot portion is arranged at the fourth layer in the U-phase slot U1 at the position of half past seven o'clock. Further, the fifth in-slot portion is arranged at the fourth layer in the U-phase slot U2 that is separated clockwise by seven slots from the U-phase slot U1 at the position of half past seven o'clock. That is, the bridging (or connection) between the fourth and fifth in-slot portions is an outermost layer-to-outermost layer bridging. The sixth to the eighth in-slot portions are arranged alternately at the third and fourth layers in the U-phase slots U2 that are successively separated clockwise by sixth slots from the respective U-phase slots U2 in which the previous in-slot portions are received. Consequently, the eighth in-slot portion is arranged at the third layer in the U-phase slot U2 at the position of half past one o'clock.

As shown in FIG. 10, the fourth winding section D1 of the first sub-winding 41U1 also has eight in-slot portions. The first in-slot portion is arranged at the second layer in the U-phase slot U2 at the position of three o'clock. In addition, the first in-slot portion of the fourth winding section D1 is connected to both the eighth in-slot portion of the second winding section B1 which is arranged at the third layer in the U-phase slot U1 at the position of half past one o'clock and the eighth in-slot portion of the third winding section C1 which is arranged at the third layer in the U-phase slot U2 at the position of half past one o'clock. The second in-slot portion is arranged at the first layer in the U-phase slot U2 that is separated clockwise by six slots from the U-phase slot U2 in which the previous (i.e., the first) in-slot portion is received. The third to the eighth in-slot portions are arranged alternately at the second and first layers in the U-phase slots U2 that are successively separated clockwise by six slots from the respective U-phase slots U2 in which the previous in-slot portions are received. Consequently, the eighth in-slot portion is arranged at the first layer in the U-phase slot U2 at the position of half past one o'clock.

The first sub-winding 41U1 of the U-phase winding is wound around the stator core 30 so as to be received in the U-phase slots U1 and U2 of the stator core 30 in the above-described manner. That is, in the present embodiment, the first sub-winding 41U1 is configured to be wound back from the counterclockwise direction to the clockwise direction at the longitudinal centers of the second and third winding sections B1 and C1 via the outermost layer-to-outermost layer bridging.

Though not illustrated in the figures, the second sub-winding 41U2 of the U-phase winding is also wound around the stator core 30 so as to be received in the U-phase slots U1 and U2 of the stator core 30 in the same manner as the first sub-winding 41U1. However, the winding start position of the second sub-winding 41U2 (i.e., the position of six o'clock in FIG. 6) is offset by about 180° in phase from the winding start position of the first sub-winding 41U1 (i.e., the position of twelve o'clock in FIG. 6). More specifically, the first in-slot portion of the first winding section A2 of the second sub-winding 41U2 is received in the U-phase slot U2 at the position of six o'clock, while the first in-slot portion of the first winding section A1 of the first sub-winding 41U1 is received in the U-phase slot U1 at the position of twelve o'clock.

Moreover, the assignment of the U-phase slots to the second sub-winding 41U2 is opposite to the assignment of the U-phase slots to the first sub-winding 41U1. For example, the first winding section A2 of the second sub-winding 41U2 are received in the U-phase slots U2 while the first winding section A1 of the first sub-winding 41U1 are received in the U-phase slots U1. Consequently, as shown in FIG. 11, in each of the U-phase slots U1 and U2, there are received four (i.e., 2×N with N being equal to 2) in-slot portions of the U-phase winding in radial alignment with each other.

FIG. 11 illustrates an example of the arrangement of the in-slot portions of the U-phase winding in the U-phase slots U1 and U2 of the stator core 30. The pair of U-phase slots U1 and U2 shown in FIG. 11 is located at the position of half past ten o'clock in FIG. 6. As shown in FIG. 11, the first winding section A1 of the first sub-winding 41U1 is arranged at the second layer in the U-phase slot U1, while the first winding section A2 of the second sub-winding 41U2 is arranged at the second layer in the U-phase slot U2; the fourth winding section D1 of the first sub-winding 41U1 is arranged at the first layer in the U-phase slot U2, while the fourth winding section D2 of the second sub-winding 41U2 is arranged at the first layer in the U-phase slot U1.

In the present embodiment, all the winding sections A1-D1 and A2-D2 of the first and second sub-windings 41U1 and 41U2 of the U-phase winding are classified into two winding section groups. The first winding section group consists of the winding sections A1, A2, D1 and D2, each of which is arranged alternately at the first and second layers in the U-phase slots U1 or U2. The second winding section group consists of the winding sections B1, B2, C1 and C2, each of which is arranged alternately at the third and fourth layers in the corresponding U-phase slots U1 and U2. That is, all the winding sections A1-D1 and A2-D2 of the first and second sub-windings 41U1 and 41U2 of the U-phase winding are classified, according to the arrangement positions in the U-phase slots U1 and U2, into N winding section groups, where N is a natural number not less than 2, and is equal to 2 in the present embodiment.

Moreover, each of the winding sections A1, A2, D1 and D2 of the first winding section group is connected only in series with the other winding sections in the sub-winding 41U1 or 41U2. Further, as described previously with reference to FIGS. 6-10, the winding sections A1, A2, D1 and D2 of the first winding section group are equally arranged in the U-phase slots U1 and the U-phase slots U2. In other words, the in-slot portions of the winding sections A1, A2, D1 and D2 are equally distributed to the U-phase slots U1 and the U-phase slots U2.

On the other hand, each of the winding sections B1, B2, C1 and C2 of the second winding section group is connected in series and in parallel with the other winding sections in the sub-winding 41U1 or 41U2. Further, as described previously with reference to FIGS. 6-10, each of the winding sections B1, B2, C1 and C2 of the second winding section group is equally arranged in the U-phase slots U1 and the U-phase slots U2. In other words, for each of the winding sections B1, B2, C1 and C2, the in-slot portions of the winding section are equally distributed to the U-phase slots U1 and the U-phase slots U2.

Accordingly, in the present embodiment, each of the first and second sub-windings 41U1 and 41U2 of the U-phase winding is equally arranged in the U-phase slots U1 and the U-phase slots U2. In other words, for each of the first and second sub-windings 41U1 and 41U2, the in-slot portions of the sub-winding are equally distributed to the U-phase slots U1 and the U-phase slots U2.

The above-described stator coil 40 of the stator 20 according to the present embodiment has the characteristics of 3T between 4T and 2T. Specifically, for each of the U-phase, V-phase and W-phase windings of the stator coil 40, the number T of turns of the phase winding can be calculated by the following equation: $T=A'/A$, where A is the electric current at an input terminal of the phase winding, and A' is the electric current inputted for each pole. For example, in the case of the U-phase winding, as shown in FIG. 5, both the electric currents respectively flowing in the first winding sections A1 and A2 of the first and second sub-windings 41U1 and 41U2 are equal to A/2; all the electric currents respectively flowing in the second and third winding sections B1, B2, C1 and C2 of the first and second sub-windings 41U1 and 41U2 are equal to A/4; and both the electric currents respectively flowing in the fourth winding sections D1 and D2 of the first and second sub-windings 41U1 and 41U2 are equal to A/2. Therefore, $A'=4\times(A/2)+4\times(A/4)=3A$; and $T=3A/A=3$. That is, the number T of turns of the U-phase winding is equal to 3.

Next, advantages of the stator 20 according to the present embodiment will be described.

In the present embodiment, the stator 20 includes the annular stator core 30 and the three-phase stator coil 40. The stator core 30 has the pairs of U-phase (i.e., first-phase) slots U1-U2, the pairs of V-phase (i.e., second-phase) slots V1-V2 and the pairs of W-phase (i.e., third-phase) slots W1-W2 that are sequentially and repeatedly provided in the circumferential direction of the stator core 30. The stator coil 40 is comprised of the U-phase, V-phase and W-phase windings that are mounted on the stator core 30 so as to be respectively received in the U-phase slots U1 -U2, the V-phase slots V1-V2 and the W-phase slots W1-W2. The U-phase, V-phase and W-phase windings are Y-connected with each other. In each of the U-phase, V-phase and W-phase slots U1-U2, V1-V2 and W1-W2 of the stator core 30, there are received four (i.e., 2×N with N being equal to 2) in-slot portions of a corresponding one of the U-phase, V-phase and W-phase windings of the stator coil 40 in radial alignment with each other. Moreover, each of the U-phase, V-phase and W-phase windings of the stator coil 40 is comprised of the sub-windings 41U1-41U2, 41V1-41V2 or 41W1-41W2 that are connected parallel to each other. Each of the sub-windings is comprised of the plurality of winding sections. The winding sections are classified into two winding section groups (i.e., N winding section groups with N being equal to 2). Each of the winding sections of the first winding section group is arranged alternately at the first and second layers in the corresponding phase slots of the stator core 30. Each of the winding sections of the second winding section group is arranged alternately at the third and fourth layers in the corresponding phase slots of the stator core 30. Each of the winding sections of the first winding section group (i.e., (N−1) winding section group with N being equal to 2) is connected via only serial connection in the sub-winding, and each of the winding sections of the second winding section group (i.e., the remaining one winding section group) is connected via both serial connection and parallel connection in the sub-winding. For example, the first sub-winding 41U1 of the U-phase winding is comprised of the winding sections A1 and D1 of the first winding section group and the winding sections B1 and C1 of the second winding section group. Each of the winding sections A1 and D1 is connected via only serial connection in the sub-winding 41U1, and each of the winding sections B1 and C1 is connected via both serial connection and parallel connection in the sub-winding 41U1.

With the above configuration, the stator coil 40 has the characteristics of 3T (i.e., kT with k being equal to 3). Moreover, since the U-phase, V-phase and W-phase windings of the stator coil 40 are only Y-connected (i.e., not Δ-connected), circulating current is prevented from being generated in the stator coil 40.

In the present embodiment, each of the sub-windings 41U1 and 41U2 of the U-phase winding is equally arranged in the U-phase slots U1 (i.e., the first first-phase slots) and the U-phase slots U2 (i.e., the second first-phase slots). Each of the sub-windings 41V1 and 41V2 of the V-phase winding is equally arranged in the V-phase slots V1 (i.e., the first second-phase slots) and the V-phase slots V2 (i.e., the second second-phase slots). Each of the sub-windings 41W1 and 41W2 of the W-phase winding is equally arranged in the W-phase slots W1 (i.e., the first third-phase slots) and the W-phase slots W2 (i.e., the second third-phase slots).

Figure 12:
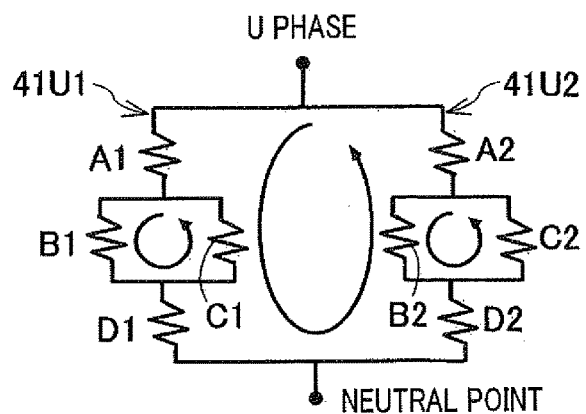
FIG. 12 is a schematic diagram illustrating the state of no circulating current being generated within the U-phase winding in the stator according to the first embodiment.

With the above arrangement, in each of the U-phase, V-phase and W-phase windings, it is possible to prevent generation of circulating current. For example, as shown in FIG. 12, in the U-phase winding, it is possible to prevent circulating current from being generated within a large loop between the first and second sub-windings 41U1 and 41U2.

Further, in the present embodiment, each of those winding sections B1, C1, B2 and C2 of the sub-windings 41U1 and 41U2 of the U-phase winding which are connected via both serial connection and parallel connection is equally arranged in the U-phase slots U1 and the U-phase slots U2. Each of those winding sections B1, C1, B2 and C2 of the sub-windings 41V1 and 41V2 of the V-phase winding which are connected via both serial connection and parallel connection is equally arranged in the V-phase slots V1 and the V-phase slots V2. Each of those winding sections B1, C1, B2 and C2 of the sub-windings 41W1 and 41W2 of the W-phase winding which are connected via both serial connection and parallel connection is equally arranged in the W-phase slots W1 and the W-phase slots W2.

With the above arrangement, in each of the sub-windings 41U1-41U2, 41V1-41V2 and 41W1-41W2 of the U-phase, V-phase and W-phase windings, it is possible to prevent generation of circulating current. For example, as shown in FIG. 12, in the first sub-winding 41U1 of the U-phase winding, it is possible to prevent circulating current from being generated within a small loop between the second and third winding sections B1 and C1. Similarly, in the second sub-winding 41U2 of the U-phase winding, it is possible to prevent circulating current from being generated within a small loop between the second and third winding sections B2 and C2.

Modification

Figure 14:
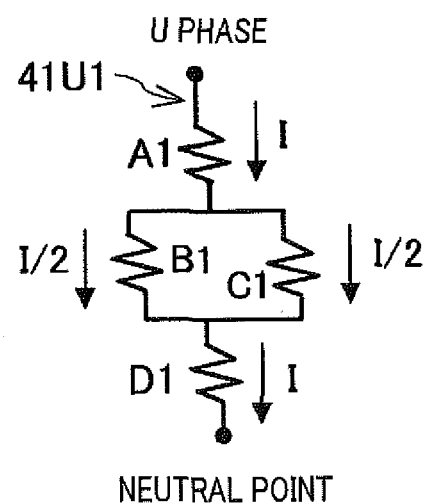
FIG. 14 is a schematic connection diagram of a first sub-winding of a U-phase winding in the stator according the modification.

In the first embodiment, for example in the first sub-winding 41U1 of the U-phase winding, as shown in FIG. 14, since the second and third winding sections B1 and C1 are connected parallel to each other, only half the electric current I flowing in the first and fourth winding sections A1 and D1 flows in each of the second and third winding sections B1 and C1.

Figure 13:
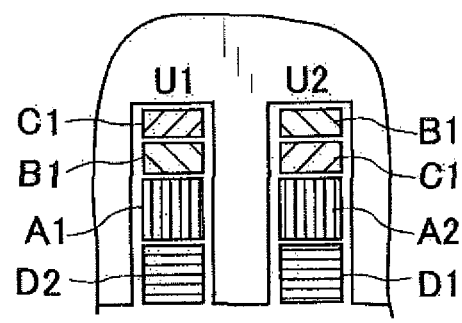
FIG. 13 is a schematic cross-sectional view of part of a stator according to a modification, the part including a pair of U-phase slots of a stator core of the stator.

In consideration of the above, in this modification, in each of the sub-windings of the U-phase, V-phase and W-phase windings, each of those winding sections which are connected via only serial connection in the sub-winding has a first cross-sectional area; each of those winding sections which are connected via both serial connection and parallel connection in the sub-winding has a second cross-sectional area; and the second cross-sectional area is set to be substantially half the first cross-sectional area. For example, as shown in FIG. 13, in the first sub-winding 41U1 of the U-phase winding, each of the first and fourth winding sections A1 and D1 has the first cross-sectional area; and each of the second and third winding sections B1 and C1 has the second cross-sectional area that is substantially half the first cross-sectional area.

With the above configuration, it is possible to reduce the radial length of each slot of the stator core 30, thereby minimizing the size of the stator 20.

Second Embodiment

This embodiment illustrates a stator 20 which has almost the same configuration as the stator 20 according to the first embodiment; accordingly, only the differences therebetween will be described hereinafter.

In the present embodiment, the stator coil 40 also has the characteristics of 3T between 4T and 2T as in the first embodiment.

However, the stator coil 40 in the present embodiment is of an outermost layer-to-innermost layer bridging type, whereas the stator coil 40 in the first embodiment is of the outermost layer-to-outermost layer bridging type as described previously.

Figure 15:
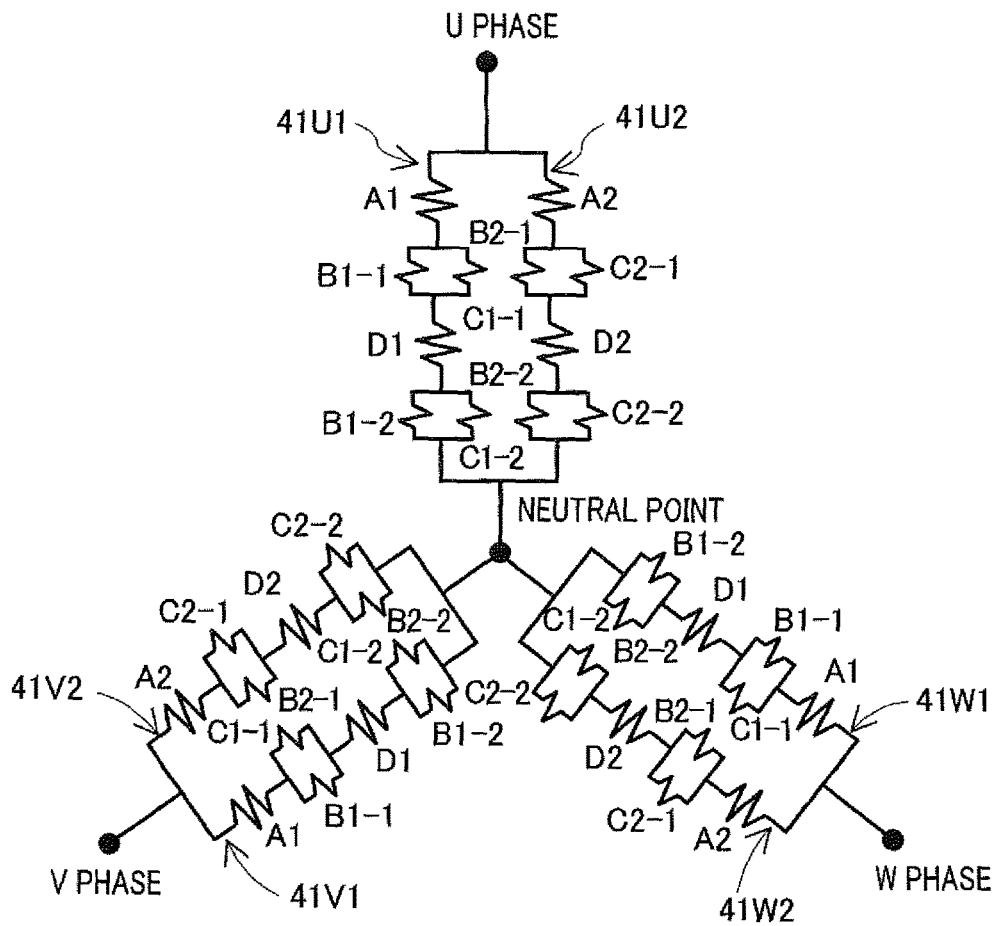
FIG. 15 is a schematic connection diagram of a stator coil of a stator according to a second embodiment.

Specifically, in the present embodiment, as shown in FIG. 15, the stator coil 40 is comprised of U-phase, V-phase and W-phase windings that are Y-connected. Further, each of the U-phase, V-phase and W-phase windings is comprised of a pair of sub-windings that are connected parallel to each other.

More specifically, the U-phase winding is comprised of first and second sub-windings 41U1 and 41U2 that are connected parallel to each other. The V-phase winding is comprised of first and second sub-windings 41V1 and 41V2 that are connected parallel to each other. The W-phase winding is comprised of first and second sub-windings 41W1 and 41W2 that are connected parallel to each other.

In addition, the U-phase, V-phase and W-phase windings have the same configuration and differ from each other only in electrical phase. Therefore, for the sake of avoiding redundancy, only the U-phase winding will be described in detail hereinafter.

Figure 16:
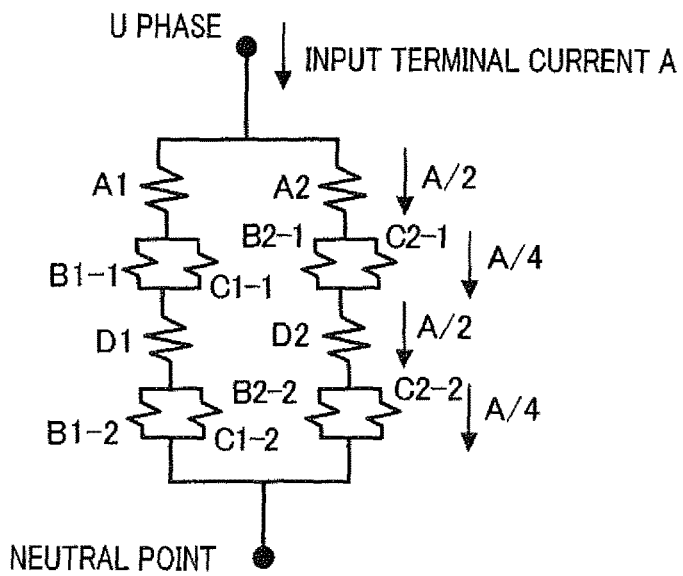
FIG. 16 is an enlarged view of a part of FIG. 15 which represents a U-phase winding of the stator coil.

As shown in FIG. 16, each of the first and second sub-windings 41U1 and 41U2 of the U-phase winding includes first to fourth winding sections. Moreover, each of the second and third winding sections is bisected in its longitudinal direction into first and second halves. The first halves of the second and third winding sections are connected parallel to each other. The second halves of the second and third winding sections are also connected parallel to each other. The parallel connection of the first halves of the second and third winding sections is arranged downstream of and serially connected to the first winding section, and arranged upstream of and serially connected to the fourth winding section. The parallel connection of the second halves of the second and third winding sections is arranged downstream of and serially connected to the fourth winding section.

More specifically, the first sub-winding 41U1 includes the first to the fourth winding sections A1, B1, C1 and D1. The parallel connection of the first halves B1-1 and C1-1 of the second and third winding sections B1 and C1 is arranged downstream of and serially connected to the first winding section A1, and arranged upstream of and serially connected to the fourth winding section D1. The parallel connection of the second halves B1-2 and C1-2 of the second and third winding sections B1 and C1 is arranged downstream of and serially connected to the fourth winding section D1. Similarly, the second sub-winding 41U2 includes the first to the fourth winding sections A2, B2, C2 and D2. The parallel connection of the first halves B2-1 and C2-1 of the second and third winding sections B2 and C2 is arranged downstream of and serially connected to the first winding section A2, and arranged upstream of and serially connected to the fourth winding section D2. The parallel connection of the second halves B2-2 and C2-2 of the second and third winding sections B2 and C2 is arranged downstream of and serially connected to the fourth winding section D2.

Figure 17:
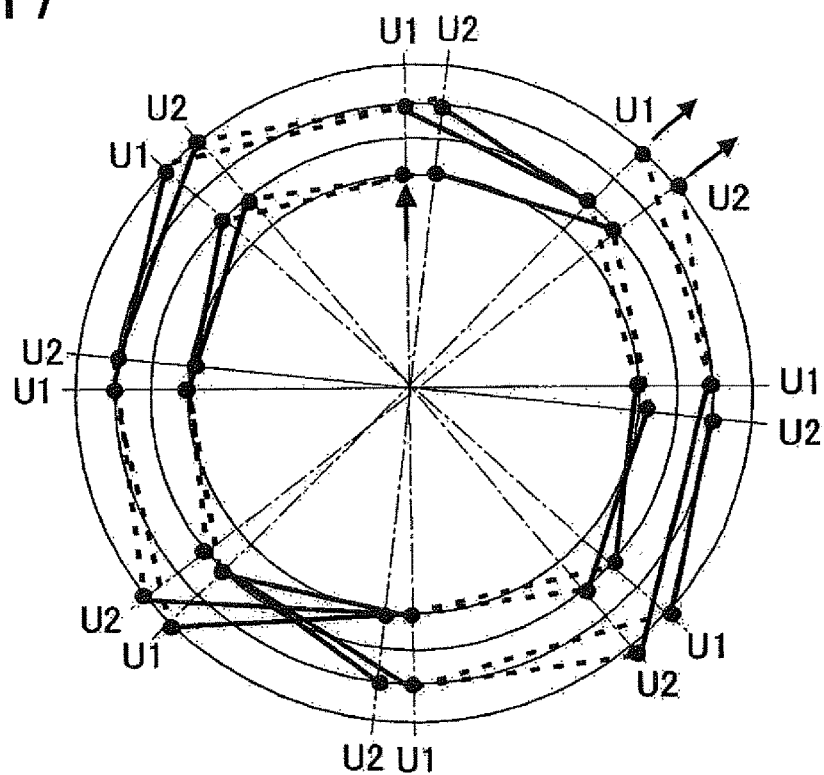
FIG. 17 is a schematic diagram illustrating all the positions of in-slot portions of a first sub-winding of the U-phase winding in the stator according to the second embodiment, the in-slot portions being received in corresponding slots of a stator core of the stator.
Figure 18:
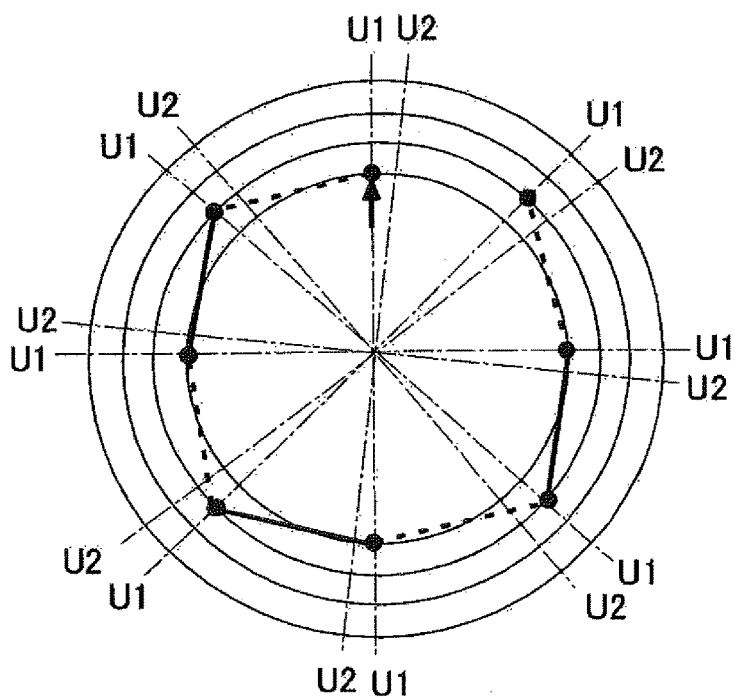
FIG. 18 is a schematic diagram illustrating only the positions of the in-slot portions of a first winding section A1 of the first sub-winding shown in FIG. 17.
Figure 19:
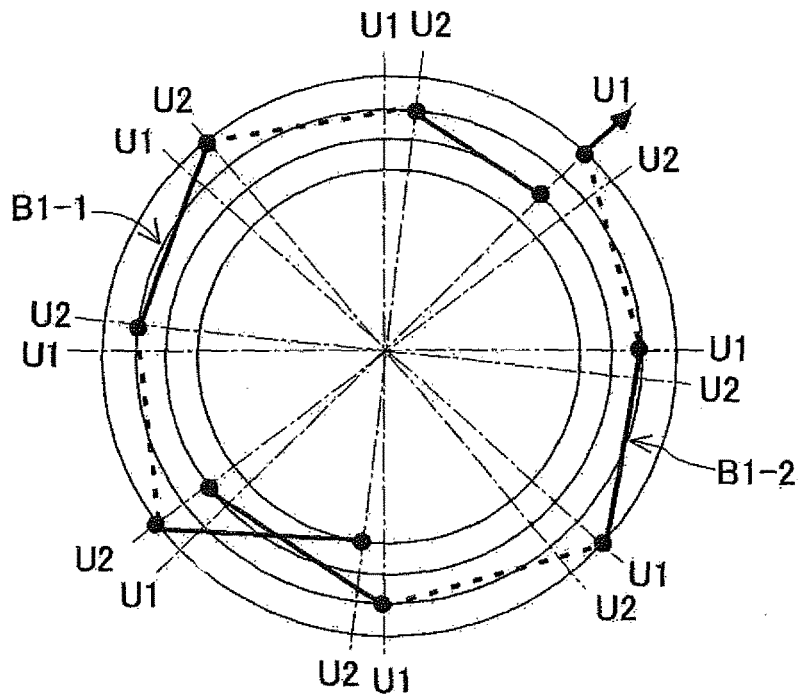
FIG. 19 is a schematic diagram illustrating only the positions of the in-slot portions of a second winding section B1 of the first sub-winding shown in FIG. 17, the second winding section B1 being bisected into a first half B1-1 and a second half B1-2.
Figure 20:
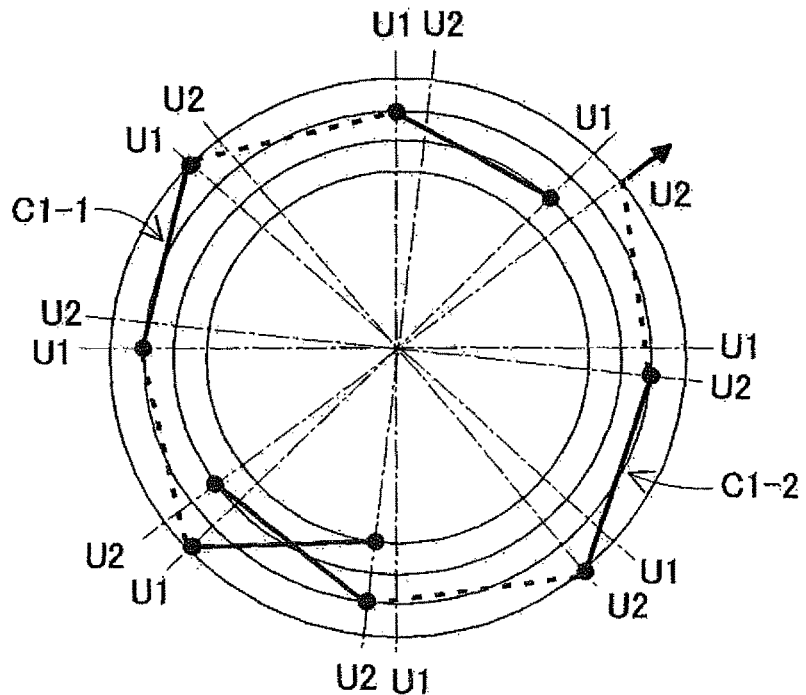
FIG. 20 is a schematic diagram illustrating only the positions of the in-slot portions of a third winding section C1 of the first sub-winding shown in FIG. 17, the third winding section C1 being bisected into a first half C1-1 and a second half C1-2.
Figure 21:
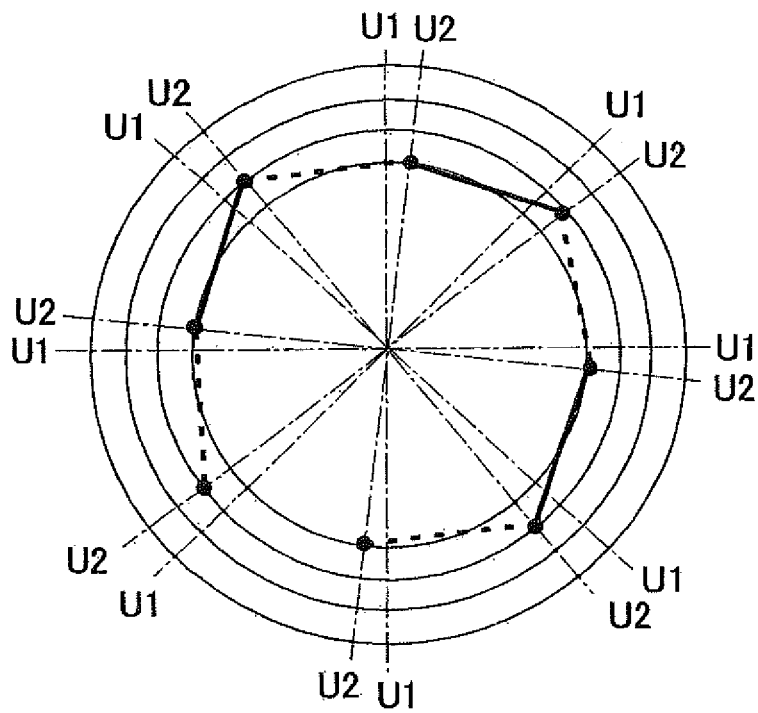
FIG. 21 is a schematic diagram illustrating only the positions of the in-slot portions of a fourth winding section D1 of the first sub-winding shown in FIG. 17.

FIG. 17 illustrates all the positions of the in-slot portions of the first sub-winding 41U1 of the U-phase winding. As described in the first embodiment, the in-slot portions of the first sub-winding 41U1 are received in the U-phase slots U1 and U2 of the stator core 30. Moreover, for the sake of ease of understanding, FIG. 18 illustrates only the positions of the in-slot portions of the first winding section A1 of the first sub-winding 41U1; FIG. 19 illustrates only the positions of the in-slot portions of the second winding section B1 of the first sub-winding 41U1; FIG. 20 illustrates only the positions of the in-slot portions of the third winding section C1 of the first sub-winding 41U1; and FIG. 21 illustrates only the positions of the in-slot portions of the fourth winding section D1 of the first sub-winding 41U1. In addition, as in FIGS. 6-10 described in the first embodiment, in FIGS. 17-21, the connections between the in-slot portions on the first coil end part 40a side are shown with continuous lines; and the connections between the in-slot portions on the second coil end part 40b side are shown with dashed lines.

As described in the first embodiment, the in-slot portions of the stator coil 40 are radially stacked in four layers in each of the slots 31 of the stator core 30. Hereinafter, for the sake of convenience of explanation, the four layers will be sequentially referred to as the first, second, third and fourth layers from the side of the radially inner periphery of the stator core 30. Moreover, for each of the first to the fourth winding sections A1-D1 of the first sub-winding 41U1, the in-slot portions of the winding section will be sequentially referred to as the first in-slot portion, the second in-slot portion, and so on from the winding start end to the winding finish end of the winding section.

As shown in FIG. 18, the first winding section A1 of the first sub-winding 41U1 has eight in-slot portions. The first in-slot portion is arranged at the first layer in the U-phase slot U1 at the position of twelve o'clock. The second in-slot portion is arranged at the second layer in the U-phase slot U1 that is separated counterclockwise by six slots from the U-phase slot U1 in which the previous (i.e., the first) in-slot portion is received. The third to the eight in-slot portions are arranged alternately at the first and second layers in the U-phase slots U1 that are successively separated counterclockwise by six slots from the respective U-phase slots U1 in which the previous in-slot portions are received. Consequently, the eighth in-slot portion is arranged at the second layer in the U-phase slot U1 at the position of half past one o'clock.

As shown in FIG. 19, the first half B1-1 of the second winding section B1 of the first sub-winding 41U1 has four in-slot portions. The first in-slot portion is arranged at the third layer in the U-phase slot U2 that is separated counterclockwise by five slots from the U-phase slot U1 at the position of half past one o'clock. In addition, the first in-slot portion of the first half B1-1 of the second winding section B1 is connected to the eighth in-slot portion of the first winding section A1 which is arranged at the second layer in the U-phase slot U1 at the position of half past one o'clock. The second to the fourth in-slot portions of the first half B1-1 of the second winding section B1 are arranged alternately at the fourth and third layers in the U-phase slots U2 that are successively separated counterclockwise by six slots from the respective U-phase slots U2 in which the previous in-slot portions are received. Consequently, the fourth in-slot portion is arranged at the fourth layer in the U-phase slot U2 at the position of half past seven o'clock.

In addition, the fourth in-slot portion of the first half B1-1 of the second winding section B1 is connected to a first in-slot portion of the fourth winding section D1 which is arranged at the first layer in the U-phase slot U2 at the position of six o'clock. That is, the bridging (or connection) between the fourth in-slot portion of the first half B1-1 of the second winding section B1 and the first in-slot portion of the fourth winding section D1 is an outermost layer-to-innermost layer bridging.

As shown in FIG. 20, the first half C1-1 of the third winding section C1 of the first sub-winding 41U1 also has four in-slot portions. The first in-slot portion is arranged at the third layer in the U-phase slot U1 that is separated counterclockwise by six slots from the U-phase slot U1 at the position of half past one o'clock. In addition, the first in-slot portion of the first half C1-1 of the third winding section C1 is also connected to the eighth in-slot portion of the first winding section A1 which is arranged at the second layer in the U-phase slot U1 at the position of half past one o'clock. The second to the fourth in-slot portions of the first half C1-1 of the third winding section C1 are arranged alternately at the fourth and third layers in the U-phase slots U1 that are successively separated counterclockwise by six slots from the respective U-phase slots U1 in which the previous in-slot portions are received. Consequently, the fourth in-slot portion is arranged at the fourth layer in the U-phase slot U1 at the position of half past seven o'clock.

In addition, the fourth in-slot portion of the first half C1-1 of the third winding section C1 is also connected to the first in-slot portion of the fourth winding section D1 which is arranged at the first layer in the U-phase slot U2 at the position of six o'clock. That is, the bridging (or connection) between the fourth in-slot portion of the first half C1-1 of the third winding section C1 and the first in-slot portion of the fourth winding section D1 is also an outermost layer-to-innermost layer bridging.

As shown in FIG. 21, the fourth winding section D1 of the first sub-winding 41U1 has eight in-slot portions. As described above, the first in-slot portion is arranged at the first layer in the U-phase slot U2 at the position of six o'clock. The second in-slot portion is arranged at the second layer in the U-phase slot U2 that is separated counterclockwise by six slots from the U-phase slot U2 in which the previous (i.e., the first) in-slot portion is received. The third to the eighth in-slot portions are arranged alternately at the first and second layers in the U-phase slots U2 that are successively separated counterclockwise by six slots from the respective U-phase slots U2 in which the previous in-slot portions are received. Consequently, the eighth in-slot portion is arranged at the second layer in the U-phase slot U2 at the position of half past seven o'clock.

Referring back to FIG. 19, the second half B1-2 of the second winding section B1 of the first sub-winding 41U1 has four in-slot portions. The first in-slot portion is arranged at the third layer in the U-phase slot U1 at the position of six o'clock. In addition, the first in-slot portion of the second half B1-2 of the second winding section B1 is connected to the eighth in-slot portion of the fourth winding section D1 which is arranged at the second layer in the U-phase slot U2 at the position of half past seven o'clock. The second to the fourth in-slot portions of the second half B1-2 of the second winding section B1 are arranged alternately at the fourth and third layers in the U-phase slots U1 that are successively separated counterclockwise by six slots from the respective U-phase slots U1 in which the previous in-slot portions are received. Consequently, the fourth in-slot portion is arranged at the fourth layer in the U-phase slot U1 at the position of half past one o'clock.

Referring again to FIG. 20, the second half C1-2 of the third winding section C1 of the first sub-winding 41U1 has four in-slot portions. The first in-slot portion is arranged at the third layer in the U-phase slot U2 at the position of six o'clock. In addition, the first in-slot portion of the second half C1-2 of the third winding section C1 is also connected to the eighth in-slot portion of the fourth winding section D1 which is arranged at the second layer in the U-phase slot U2 at the position of half past seven o'clock. The second to the fourth in-slot portions of the second half C1-2 of the third winding section C1 are arranged alternately at the fourth and third layers in the U-phase slots U2 that are successively separated counterclockwise by six slots from the respective U-phase slots U2 in which the previous in-slot portions are received. Consequently, the fourth in-slot portion is arranged at the fourth layer in the U-phase slot U2 at the position of half past one o'clock.

The first sub-winding 41U1 of the U-phase winding is wound around the stator core 30 so as to be received in the U-phase slots U1 and U2 of the stator core 30 in the above-described manner. That is, in the present embodiment, the first sub-winding 41U1 is configured to connect each of the first halves B1-1 and C1-1 of the second and third winding sections B1 and C1 to the fourth winding section D1 via the outermost layer-to-innermost layer bridging.

Though not illustrated in the figures, the second sub-winding 41U2 of the U-phase winding is also wound around the stator core 30 so as to be received in the U-phase slots U1 and U2 of the stator core 30 in the same manner as the first sub-winding 41U1. However, the winding start position of the second sub-winding 41U2 (i.e., the position of half past ten o'clock in FIG. 17) is offset counterclockwise by about 45° in phase from the winding start position of the first sub-winding 41U1 (i.e., the position of twelve o'clock in FIG. 17). More specifically, the first in-slot portion of the first winding section A2 of the second sub-winding 41U2 is received in the U-phase slot U2 at the position of half past ten o'clock, while the first in-slot portion of the first winding section A1 of the first sub-winding 41U1 is received in the U-phase slot U1 at the position of twelve o'clock.

Moreover, the assignment of the U-phase slots U1 and U2 to the second sub-winding 41U2 is opposite to that to the first sub-winding 41U1. For example, the first winding section A2 of the second sub-winding 41U2 are received in the U-phase slots U2 while the first winding section A1 of the first sub-winding 41U1 are received in the U-phase slots U1. Consequently, as shown in FIG. 22, in each of the U-phase slots U1 and U2, there are received four (i.e., 2×N with N being equal to 2) in-slot portions of the U-phase winding in radial alignment with each other.

Figure 22:
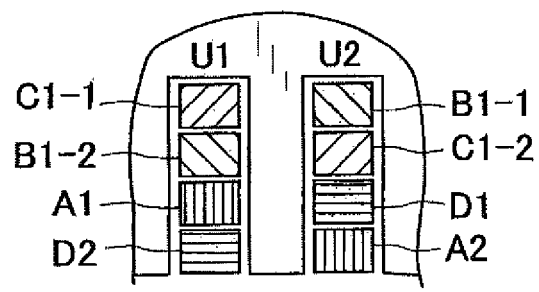
FIG. 22 is a schematic cross-sectional view of part of the stator according to the second embodiment, the part including a pair of U-phase slots of the stator core of the stator.

FIG. 22 illustrates an example of the arrangement of the in-slot portions of the U-phase winding in the U-phase slots U1 and U2 of the stator core 30, The pair of U-phase slots U1 and U2 shown in FIG. 22 is located at the position of half past ten o'clock in FIG. 17. As shown in FIG. 22, the first winding section A1 of the first sub-winding 41U1 is arranged at the second layer in the U-phase slot U1, while the first winding section A2 of the second sub-winding 41U2 is arranged at the first layer in the U-phase slot U2; the fourth winding section D1 of the first sub-winding 41U1 is arranged at the second layer in the U-phase slot U2, while the fourth winding section D2 of the second sub-winding 41U2 is arranged at the first layer in the U-phase slot U1.

In the present embodiment, all the winding sections A1-D1 and A2-D2 of the first and second sub-windings 41U1 and 41U2 of the U-phase winding are classified into two winding section groups. The first winding section group consists of the winding sections A1, A2, D1 and D2, each of which is arranged alternately at the first and second layers in the U-phase slots U1 or U2. The second winding section group consists of the winding sections B1, B2, C1 and C2, each of which is arranged alternately at the third and fourth layers in the corresponding U-phase slots U1 and U2. That is, all the winding sections A1-D1 and A2-D2 of the first and second sub-windings 41U1 and 41U2 of the U-phase winding are classified, according to the arrangement positions in the U-phase slots U1 and U2, into N winding section groups, where N is a natural number not less than 2, and is equal to 2 in the present embodiment.

Moreover, each of the winding sections A1, A2, D1 and D2 of the first winding section group is connected only in series with the other winding sections in the sub-winding 41U1 or 41U2. Further, as described previously with reference to FIGS. 17-21, the winding sections A1, A2, D1 and D2 of the first winding section group are equally arranged in the U-phase slots U1 and the U-phase slots U2. In other words, the in-slot portions of the winding sections A1, A2, D1 and D2 are equally distributed to the U-phase slots U1 and the U-phase slots U2.

On the other hand, each of the winding sections B1, B2, C1 and C2 of the second winding section group is connected in series and in parallel with the other winding sections in the sub-winding 41U1 or 41U2. Further, as described previously with reference to FIGS. 17-21, each of the winding sections B1, B2, C1 and C2 of the second winding section group is equally arranged in the U-phase slots U1 and the U-phase slots U2. In other words, for each of the winding sections B1, B2, C1 and C2, the in-slot portions of the winding section are equally distributed to the U-phase slots U1 and the U-phase slots U2.

Accordingly, in the present embodiment, each of the first and second sub-windings 41U1 and 41U2 of the U-phase winding is equally arranged in the U-phase slots U1 and the U-phase slots U2. In other words, for each of the first and second sub-windings 41U1 and 41U2, the in-slot portions of the sub-winding are equally distributed to the U-phase slots U1 and the U-phase slots U2.

The above-described stator coil 40 of the stator 20 according to the present embodiment has the characteristics of 3T between 4T and 2T. For example, in the case of the U-phase winding, as shown in FIG. 16, both the electric currents respectively flowing in the first winding sections A1 and A2 of the first and second sub-windings 41U1 and 41U2 are equal to A/2; all the electric currents respectively flowing in the first halves B1-1, B2-1, C1-1 and C2-1 of the second and third winding sections B1, B2, C1 and C2 of the first and second sub-windings 41U1 and 41U2 are equal to A/4; both the electric currents respectively flowing in the fourth winding sections D1 and D2 of the first and second sub-windings 41U1 and 41U2 are equal to A/2; and all the electric currents respectively flowing in the second halves B1-2, B2-2, C1-2 and C2-2 of the second and third winding sections B1, B2, C1 and C2 of the first and second sub-windings 41U1 and 41U2 are equal to A/4. Therefore, A'=4×(A/2)+4×(A/4)=3A; and T=3A/A=3. That is, the number T of turns of the U-phase winding is equal to 3.

The above-described stator 20 according to the present embodiment has the same advantages as the stator 20 according to the first embodiment.

In addition, as in the previously-described modification to the first embodiment, it is also possible to modify the stator coil 40 of the stator 20 according to the present embodiment so that: each of the winding sections A1, A2, D1 and D2 that are connected via only serial connection has a first cross-sectional area; each of the winding sections B1, B2, C1 and C2 that are connected via both serial connection and parallel connection has a second cross-sectional area; and the second cross-sectional area is set to be substantially half the first cross-sectional area.

Third Embodiment

This embodiment illustrates a stator 20 which has almost the same configuration as the stator 20 according to the first embodiment; accordingly, only the differences therebetween will be described hereinafter.

In the first embodiment, the stator coil 40 of the stator 20 is configured to have the characteristics of 3T between 4T and 2T.

In comparison, in the present embodiment, the stator coil 40 of the stator 20 is configured to have the characteristics of 5T (i.e., kT with k being equal to 5) between 6T and 4T.

Figure 23:
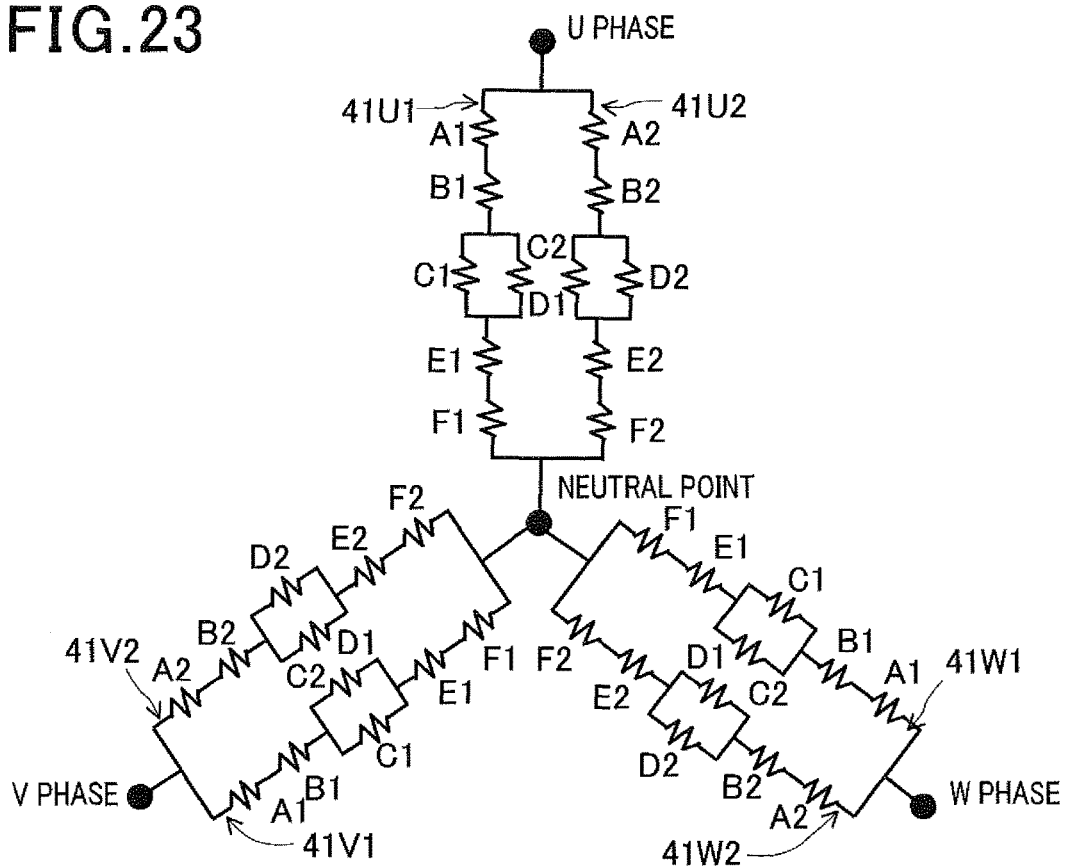
FIG. 23 is a schematic connection diagram of a stator coil of a stator according to a third embodiment.

Specifically, in the present embodiment, as shown in FIG. 23, the stator coil 40 is comprised of U-phase, V-phase and W-phase windings that are Y-connected. Further, each of the U-phase, V-phase and W-phase windings is comprised of a pair of sub-windings that are connected parallel to each other.

More specifically, the U-phase winding is comprised of first and second sub-windings 41U1 and 41U2 that are connected parallel to each other. The V-phase winding is comprised of first and second sub-windings 41V1 and 41V2 that are connected parallel to each other. The W-phase winding is comprised of first and second sub-windings 41W1 and 41W2 that are connected parallel to each other.

In addition, the U-phase, V-phase and W-phase windings have the same configuration and differ from each other only in electrical phase. Therefore, for the sake of avoiding redundancy, only the U-phase winding will be described in detail hereinafter.

Figure 24:
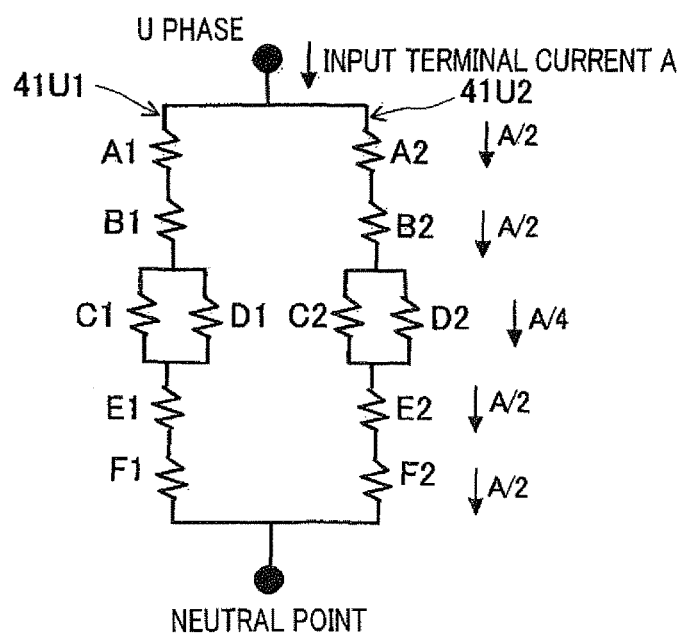
FIG. 24 is an enlarged view of a part of FIG. 23 which represents a U-phase winding of the stator coil.

As shown in FIG. 24, each of the first and second sub-windings 41U1 and 41U2 of the U-phase winding includes first to sixth winding sections. Moreover, the fourth and fifth winding sections are connected parallel to each other. The first and second winding sections are arranged upstream of and serially connected to the parallel connection of the fourth and fifth winding sections. The fifth and sixth winding sections are arranged downstream of and serially connected to the parallel connection of the fourth and fifth winding sections.

Figure 25:
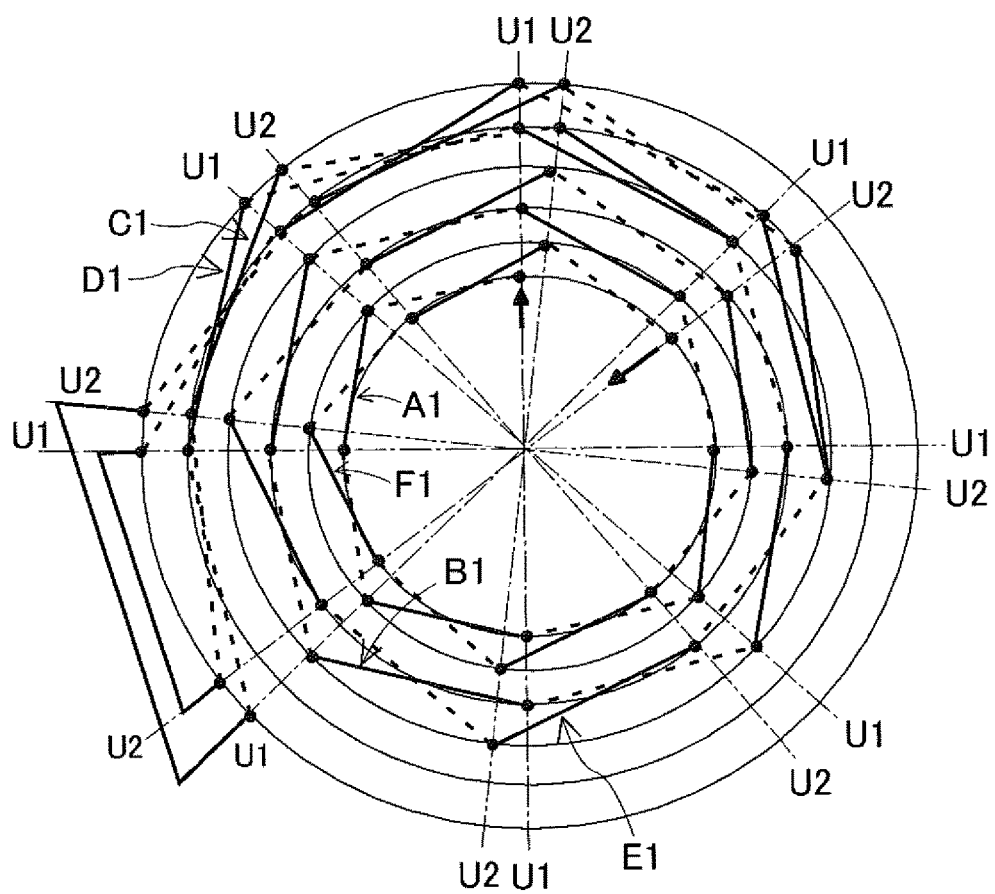
FIG. 25 is a schematic diagram illustrating all the positions of in-slot portions of a first sub-winding of the U-phase winding in the stator according to the third embodiment, the in-slot portions being received in corresponding slots of a stator core of the stator.

More specifically, the first sub-winding 41U1 includes the first to the sixth winding sections A1, B1, C1, D1, E1 and F1. The first and second winding sections A1 and B1 are arranged upstream of and serially connected to the parallel connection of the fourth and fifth winding sections C1 and D1. The fifth and sixth winding sections E1 and F1 are arranged downstream of and serially connected to the parallel connection of the fourth and fifth winding sections C1 and D1. Similarly, the second sub-winding 41U2 includes the first to the sixth winding sections A2, B2, C2, D2, E2 and F2. The first and second winding sections A2 and B2 are arranged upstream of and serially connected to the parallel connection of the fourth and fifth winding sections C2 and D2. The fifth and sixth winding sections E2 and F2 are arranged downstream of and serially connected to the parallel connection of the fourth and fifth winding sections C2 and D2, FIG. 25 illustrates all the positions of the in-slot portions of the first sub-winding 41U1 of the U-phase winding. As described in the first embodiment, the in-slot portions of the first sub-winding 41U1 are received in the U-phase slots U1 and U2 of the stator core 30. In addition, as in FIG. 6 described in the first embodiment, in FIG. 25, the connections between the in-slot portions on the first coil end part 40a side are shown with continuous lines; and the connections between the in-slot portions on the second coil end part 40b side are shown with dashed lines.

Figure 26:
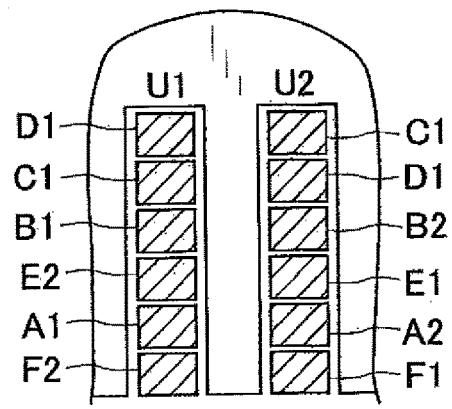
FIG. 26 is a schematic cross-sectional view of part of the stator according to the third embodiment, the part including a pair of U-phase slots of the stator core of the stator.

In the present embodiment, as shown in FIG. 26, the in-slot portions of the stator coil 40 are radially stacked in six (i.e., 2×N with N being equal to 3) layers in each of the slots 31 of the stator core 30. Hereinafter, for the sake of convenience of explanation, the six layers will be sequentially referred to as the first, second, third, fourth, fifth and sixth layers from the side of the radially inner periphery of the stator core 30. Moreover, for each of the first to the sixth winding sections A1-F1 of the first sub-winding 41U1, the in-slot portions of the winding section will be sequentially referred to as the first in-slot portion, the second in-slot portion, . . . , and so on from the winding start end to the winding finish end of the winding section.

As shown in FIG. 25, the first winding section A1 of the first sub-winding 41U1 has eight in-slot portions. The first in-slot portion is arranged at the first layer in the U-phase slot U1 at the position of twelve o'clock. The second in-slot portion is arranged at the second layer in the U-phase slot U1 that is separated counterclockwise by six slots from the U-phase slot U1 in which the previous (i.e., the first) in-slot portion is received. The third to the eight in-slot portions are arranged alternately at the first and second layers in the U-phase slots U1 that are successively separated counterclockwise by six slots from the respective U-phase slots U1 in which the previous in-slot portions are received. Consequently, the eighth in-slot portion is arranged at the second layer in the U-phase slot U1 at the position of half past one o'clock.

The second winding section B1 of the first sub-winding 41U1 also has eight in-slot portions. The first in-slot portion is arranged at the third layer in the U-phase slot U1 that is separated counterclockwise by six slots from the U-phase slot U1 at the position of half past one o'clock. In addition, the first in-slot portion of the second winding section B1 is connected to the eighth in-slot portion of the first winding section A1 which is arranged at the second layer in the U-phase slot U1 at the position of half past one o'clock. The second to the eighth in-slot portions of the second winding section B1 are arranged alternately at the fourth and third layers in the U-phase slots U1 that are successively separated counterclockwise by six slots from the respective U-phase slots U1 in which the previous in-slot portions are received. Consequently, the eighth in-slot portion is arranged at the fourth layer in the U-phase slot U1 at the position of half past one o'clock.

The third winding section C1 of the first sub-winding 41U1 also has eight in-slot portions. The first in-slot portion is arranged at the fifth layer in the U-phase slot U2 that is separated counterclockwise by five slots from the U-phase slot U1 at the position of half past one o'clock. In addition, the first in-slot portion of the third winding section C1 is connected to the eighth in-slot portion of the second winding section B1 which is arranged at the fourth layer in the U-phase slot U1 at the position of half past one o'clock. The second to the fourth in-slot portions of the third winding section C1 are arranged alternately at the sixth and fifth layers in the U-phase slots U2 that are successively separated counterclockwise by six slots from the respective U-phase slots U2 in which the previous in-slot portions are received. Consequently, the fourth in-slot portion is arranged at the sixth layer in the U-phase slot U2 at the position of half past seven o'clock. Further, the fifth in-slot portion is arranged at the sixth layer in the U-phase slot U1 that is separated clockwise by five slots from the U-phase slot U2 at the position of half past seven o'clock. That is, the bridging (or connection) between the fourth and fifth in-slot portions is an outermost layer-to-outermost layer bridging. The sixth to the eighth in-slot portions are arranged alternately at the fifth and sixth layers in the U-phase slots U1 that are successively separated clockwise by sixth slots from the respective U-phase slots U1 in which the previous in-slot portions are received. Consequently, the eighth in-slot portion is arranged at the fifth layer in the U-phase slot U1 at the position of half past one o'clock.

The fourth winding section D1 of the first sub-winding 41U1 also has eight in-slot portions. The first in-slot portion is arranged at the fifth layer in the U-phase slot U1 that is separated counterclockwise by six slots from the U-phase slot U1 at the position of half past one o'clock. In addition, the first in-slot portion of the fourth winding section D1 is also connected to the eighth in-slot portion of the second winding section B1 which is arranged at the fourth layer in the U-phase slot U1 at the position of half past one o'clock. The second to the fourth in-slot portions of the fourth winding section D1 are arranged alternately at the sixth and fifth layers in the U-phase slots U1 that are successively separated counterclockwise by six slots from the respective U-phase slots U1 in which the previous in-slot portions are received. Consequently, the fourth in-slot portion is arranged at the sixth layer in the U-phase slot U1 at the position of half past seven o'clock. Further, the fifth in-slot portion is arranged at the sixth layer in the U-phase slot U2 that is separated clockwise by seven slots from the U-phase slot U1 at the position of half past seven o'clock. That is, the bridging (or connection) between the fourth and fifth in-slot portions is an outermost layer-to-outermost layer bridging. The sixth to the eighth in-slot portions are arranged alternately at the fifth and sixth layers in the U-phase slots U2 that are successively separated clockwise by sixth slots from the respective U-phase slots U2 in which the previous in-slot portions are received. Consequently, the eighth in-slot portion is arranged at the fifth layer in the U-phase slot U2 at the position of half past one o'clock.

The fifth winding section E1 of the first sub-winding 41U1 also has eight in-slot portions. The first in-slot portion is arranged at the fourth layer in the U-phase slot U2 at the position of three o'clock. In addition, the first in-slot portion of the fifth winding section E1 is connected to both the eighth in-slot portion of the third winding section C1 which is arranged at the fifth layer in the U-phase slot U1 at the position of half past one o'clock and the eighth in-slot portion of the fourth winding section D1 which is arranged at the fifth layer in the U-phase slot U2 at the position of half past one o'clock. The second in-slot portion of the fifth winding section E1 is arranged at the third layer in the U-phase slot U2 that is separated clockwise by six slots from the U-phase slot U2 in which the previous (i.e., the first) in-slot portion is received. The third to the eighth in-slot portions are arranged alternately at the fourth and third layers in the U-phase slots U2 that are successively separated clockwise by six slots from the respective U-phase slots U2 in which the previous in-slot portions are received. Consequently, the eighth in-slot portion is arranged at the third layer in the U-phase slot U2 at the position of half past one o'clock.

The sixth winding section F1 of the first sub-winding 41U1 also has eight in-slot portions. The first in-slot portion is arranged at the second layer in the U-phase slot U2 that is separated clockwise by six slots from the U-phase slot U2 at the position of half past one o'clock. In addition, the first in-slot portion of the sixth winding section F1 is connected to the eighth in-slot portion of the fifth winding section E1 which is arranged at the third layer in the U-phase slot U2 at the position of half past one o'clock. The second to the eighth in-slot portions of the sixth winding section F1 are arranged alternately at the first and second layers in the U-phase slots U2 that are successively separated clockwise by six slots from the respective U-phase slots U2 in which the previous in-slot portions are received. Consequently, the eighth in-slot portion is arranged at the first layer in the U-phase slot U2 at the position of half past one o'clock.

The first sub-winding 41U1 of the U-phase winding is wound around the stator core 30 so as to be received in the U-phase slots U1 and U2 of the stator core 30 in the above-described manner. That is, in the present embodiment, the first sub-winding 41U1 is configured to be wound back from the counterclockwise direction to the clockwise direction at the longitudinal centers of the fourth and fifth winding sections C1 and D1 via the outermost layer-to-outermost layer bridging.

In addition, though not illustrated in the figures, the second sub-winding 41U2 of the U-phase winding is also wound around the stator core 30 so as to be received in the U-phase slots U1 and U2 of the stator core 30 in the same manner as the first sub-winding 41U1.

FIG. 26 illustrates an example of the arrangement of the in-slot portions of the U-phase winding in the U-phase slots U1 and U2 of the stator core 30. The pair of U-phase slots U1 and U2 shown in FIG. 26 is located at the position of half past ten o'clock in FIG. 25. As shown in FIG. 25, the first winding section A1 of the first sub-winding 41U1 is arranged at the second layer in the U-phase slot U1, while the first winding section A2 of the second sub-winding 41U2 is arranged at the second layer in the U-phase slot U2; the second winding section B1 of the first sub-winding 41U1 is arranged at the fourth layer in the U-phase slot U1, while the second winding section B2 of the second sub-winding 41U2 is arranged at the fourth layer in the U-phase slot U2; the fifth winding section E1 of the first sub-winding 41U1 is arranged at the third layer in the U-phase slot U2, while the fifth winding section E2 of the second sub-winding 41U2 is arranged at the third layer in the U-phase slot U1; and the sixth winding section F1 of the first sub-winding 41U1 is arranged at the first layer in the U-phase slot U2, while the sixth winding section F2 of the second sub-winding 41U2 is arranged at the first layer in the U-phase slot U1.

In the present embodiment, all the winding sections A1-F1 and A2-F2 of the first and second sub-windings 41U1 and 41U2 of the U-phase winding are classified into three winding section groups. The first winding section group consists of the winding sections A1, A2, F1 and F2, each of which is arranged alternately at the first and second layers in the U-phase slots U1 or U2. The second winding section group consists of the winding sections B1, B2, E1 and E2, each of which is arranged alternately at the third and fourth layers in the U-phase slots U1 or U2. The third winding section group consists of the winding sections C1, C2, D1 and D2, each of which is arranged alternately at the fifth and sixth layers in the corresponding U-phase slots U1 and U2. That is, all the winding sections A1-F1 and A2-F2 of the first and second sub-windings 41U1 and 41U2 of the U-phase winding are classified, according to the arrangement positions in the U-phase slots U1 and U2, into N winding section groups, where N is a natural number not less than 2 and equal to 3 in the present embodiment.

Moreover, each of the winding sections A1, A2, B1, B2, E1, E2, F1 and F2 of the first and second winding section groups (i.e., (N−1) winding section groups with N being equal to 3) is connected only in series with the other winding sections in the sub-winding 41U1 or 41U2. Further, as described previously with reference to FIG. 25, the winding sections A1, A2, B1, B2, E1, E2, F1 and F2 of the first and second winding section groups are equally arranged in the U-phase slots U1 and the U-phase slots U2. In other words, the in-slot portions of the winding sections A1, A2, B1, B2, E1, E2, F1 and F2 are equally distributed to the U-phase slots U1 and the U-phase slots U2.

On the other hand, each of the winding sections C1, C2, D1 and D2 of the third winding section group (i.e., the remaining one winding section group) is connected in series and in parallel with the other winding sections in the sub-winding 41U1 or 41U2. Further, as described previously with reference to FIG. 25, each of the winding sections C1, C2, D1 and D2 of the third winding section group is equally arranged in the U-phase slots U1 and the U-phase slots U2. In other words, for each of the winding sections C1, C2, D1 and D2, the in-slot portions of the winding section are equally distributed to the U-phase slots U1 and the U-phase slots U2.

Accordingly, in the present embodiment, each of the first and second sub-windings 41U1 and 41U2 of the U-phase winding is equally arranged in the U-phase slots U1 and the U-phase slots U2. In other words, for each of the first and second sub-windings 41U1 and 41U2, the in-slot portions of the sub-winding are equally distributed to the U-phase slots U1 and the U-phase slots U2.

The above-described stator coil 40 of the stator 20 according to the present embodiment has the characteristics of 5T between 6T and 4T. For example, in the case of the U-phase winding, as shown in FIG. 24, all the electric currents respectively flowing in the first and second winding sections A1, A2, B1 and B2 of the first and second sub-windings 41U1 and 41U2 are equal to A/2; all the electric currents respectively flowing in the fourth and fifth winding sections C1, C2, D1 and D2 of the first and second sub-windings 41U1 and 41U2 are equal to A/4; and all the electric currents respectively flowing in the fifth and sixth winding sections E1, E2, F1 and F2 of the first and second sub-windings 41U1 and 41U2 are equal to A/2. Therefore, A'=8×(A/2)+4×(A/4)=5A; and T=5A/A=5. That is, the number T of turns of the U-phase winding is equal to 5.

The above-described stator 20 according to the present embodiment has the same advantages as the stator 20 according to the first embodiment.

In addition, as in the previously-described modification to the first embodiment, it is also possible to modify the stator coil 40 of the stator 20 according to the present embodiment so that: each of the winding sections A1, A2, B1, B2, E1, E2, F1 and F2 that are connected via only serial connection has a first cross-sectional area; each of the winding sections C1, C2, D1 and D2 that are connected via both serial connection and parallel connection has a second cross-sectional area; and the second cross-sectional area is set to be substantially half the first cross-sectional area.

Fourth Embodiment

This embodiment illustrates a stator 20 which has almost the same configuration as the stator 20 according to the third embodiment; accordingly, only the differences therebetween will be described hereinafter.

In the present embodiment, the stator coil 40 also has the characteristics of 5T between 6T and 4T as in the third embodiment.

However, the stator coil 40 in the present embodiment is of an outermost layer-to-innermost layer bridging type, whereas the stator coil 40 in the third embodiment is of the outermost layer-to-outermost layer bridging type as described previously.

Figure 27:
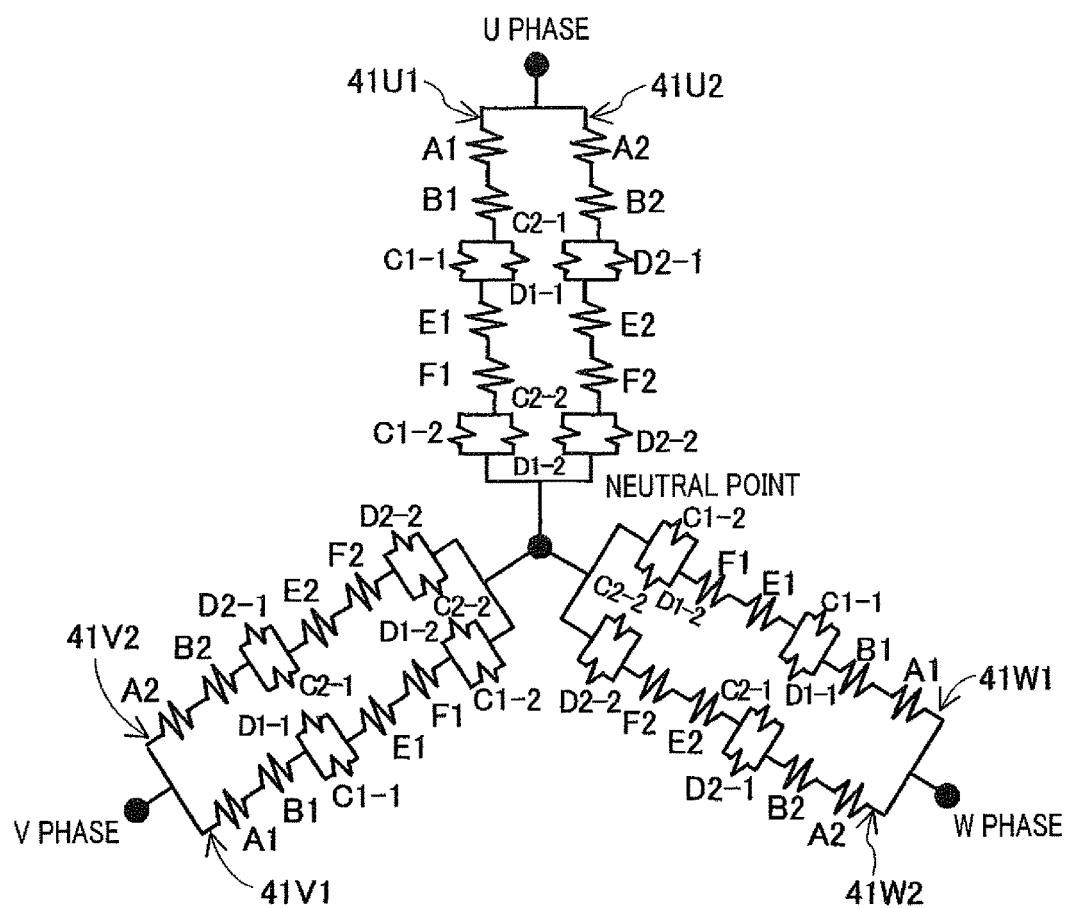
FIG. 27 is a schematic connection diagram of a stator coil of a stator according to a fourth embodiment.

Specifically, in the present embodiment, as shown in FIG. 27, the stator coil 40 is comprised of U-phase, V-phase and W-phase windings that are Y-connected. Further, each of the U-phase, V-phase and W-phase windings is comprised of a pair of sub-windings that are connected parallel to each other.

More specifically, the U-phase winding is comprised of first and second sub-windings 41U1 and 41U2 that are connected parallel to each other. The V-phase winding is comprised of first and second sub-windings 41V1 and 41V2 that are connected parallel to each other. The W-phase winding is comprised of first and second sub-windings 41W1 and 41W2 that are connected parallel to each other.

In addition, the U-phase, V-phase and W-phase windings have the same configuration and differ from each other only in electrical phase. Therefore, for the sake of avoiding redundancy, only the U-phase winding will be described in detail hereinafter.

Figure 28:
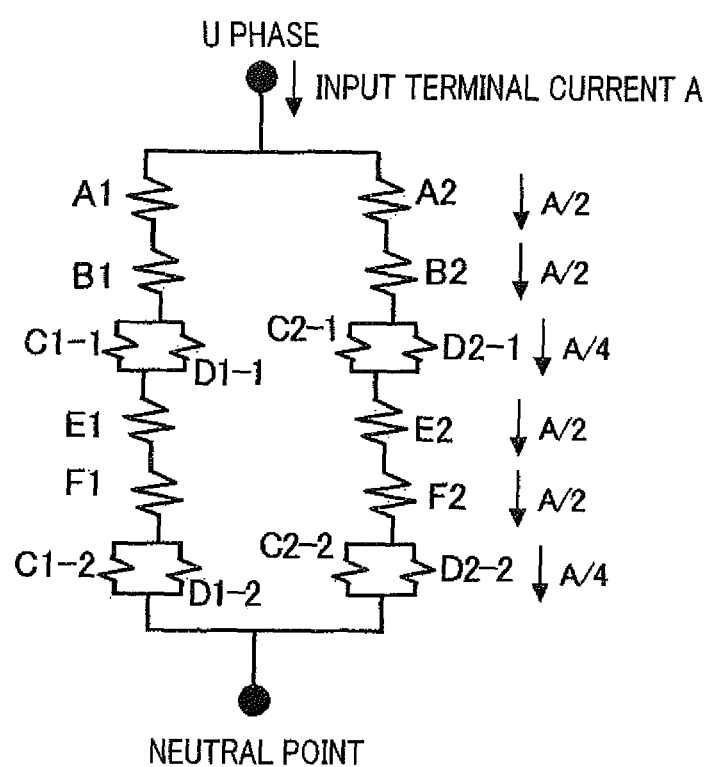
FIG. 28 is an enlarged view of a part of FIG. 27 which represents a U-phase winding of the stator coil.

As shown in FIG. 28, each of the first and second sub-windings 41U1 and 41U2 of the U-phase winding includes first to sixth winding sections. Moreover, each of the fourth and fifth winding sections is bisected in its longitudinal direction into first and second halves. The first halves of the fourth and fifth winding sections are connected parallel to each other. The second halves of the fourth and fifth winding sections are also connected parallel to each other. The parallel connection of the first halves of the fourth and fifth winding sections is arranged downstream of and serially connected to the first and second winding sections, and arranged upstream of and serially connected to the fifth and sixth winding sections. The parallel connection of the second halves of the fourth and fifth winding sections is arranged downstream of and serially connected to the fifth and sixth winding sections.

More specifically, the first sub-winding 41U1 includes the first to the sixth winding sections A1, B1, C1, D1, E1 and F1. The parallel connection of the first halves C1-1 and D1-1 of the fourth and fifth winding sections C1 and D1 is arranged downstream of and serially connected to the first and second winding sections A1 and B1, and arranged upstream of and serially connected to the fifth and sixth winding sections E1 and F1. The parallel connection of the second halves C1-2 and D1-2 of the fourth and fifth winding sections C1 and D1 is arranged downstream of and serially connected to the fifth and sixth winding sections E1 and F1. Similarly, the second sub-winding 41U2 includes the first to the sixth winding sections A2, B2, C2, D2, E2 and F2. The parallel connection of the first halves C2-1 and D2-1 of the fourth and fifth winding sections C2 and D2 is arranged downstream of and serially connected to the first and second winding sections A2 and B2, and arranged upstream of and serially connected to the fifth and sixth winding sections E2 and F2. The parallel connection of the second halves C2-2 and D2-2 of the fourth and fifth winding sections C2 and D2 is arranged downstream of and serially connected to the fifth and sixth winding sections E2 and F2.

Though not shown in the figures, in the present embodiment, the in-slot portions of the stator coil 40 are radially stacked in six (i.e., 2×N with N being equal to 3) layers in each of the slots 31 of the stator core 30. Hereinafter, for the sake of convenience of explanation, the six layers will be sequentially referred to as the first, second, third, fourth, fifth and sixth layers from the side of the radially inner periphery of the stator core 30. Moreover, for each of the first to the sixth winding sections A1-F1 of the first sub-winding 41U1, the in-slot portions of the winding section will be sequentially referred to as the first in-slot portion, the second in-slot portion, . . . , and so on from the winding start end to the winding finish end of the winding section.

In the present embodiment, the first sub-winding 41U1 of the U-phase winding is wound around the stator core 30 in a manner that is a combination of those manners described in the second and third embodiments.

Specifically, in the present embodiment, though not shown in the figures, the first winding section A1 of the first sub-winding 41U1 has eight in-slot portions. The first to the eighth in-slot portions of the first winding section A1 are alternately arranged at the first and second layers in the U-phase slots U1.

The second winding section B1 of the first sub-winding 41U1 also has eight in-slot portions. The first to the eighth in-slot portions of the second winding section B1 are arranged alternately at the third and fourth layers in the U-phase slots U1.

The first half C1-1 of the third winding section C1 has four in-slot portions. The first to the fourth in-slot portions of the first half C1-1 of the third winding section C1 are arranged alternately at the fifth and sixth layers in the corresponding U-phase slots U2.

The first half D1-1 of the fourth winding section D1 also has four in-slot portions. The first to the fourth in-slot portions of the first half D1-1 of the fourth winding section D1 are arranged alternately at the fifth and sixth layers in the corresponding U-phase slots U1.

The fifth winding section E1 of the first sub-winding 41U1 has eight in-slot portions. The first to the eighth in-slot portions of the fifth winding section E1 are arranged alternately at the first and second layers in the U-phase slots U2.

In addition, each of the fourth in-slot portions of the first halves C1-1 and D1-1 of the fourth and fifth winding sections C1 and D1 is connected to the first in-slot portion of the fifth winding section E1 via an outermost layer-to-innermost layer bridging (i.e., sixth layer-to-first layer bridging).

The sixth winding section F1 of the first sub-winding 41U1 also has eight in-slot portions. The first to the eighth in-slot portions of the sixth winding section F1 are arranged alternately at the third and fourth layers in the U-phase slots U2.

The second half C1-2 of the third winding section C1 has four in-slot portions. The first to the fourth in-slot portions of the second half C1-2 of the third winding section C1 are arranged alternately at the fifth and sixth layers in the corresponding U-phase slots U1.

The second half D1-2 of the fourth winding section D1 also has four in-slot portions. The first to the fourth in-slot portions of the second half D1-2 of the fourth winding section D1 are arranged alternately at the fifth and sixth layers in the corresponding U-phase slots U2.

The first sub-winding 41U1 of the U-phase winding is wound around the stator core 30 so as to be received in the U-phase slots U1 and U2 of the stator core 30 in the above-described manner. That is, in the present embodiment, the first sub-winding 41U1 is configured to connect each of the first halves C1-1 and D1-1 of the fourth and fifth winding sections C1 and D1 to the fifth winding section E1 via the outermost layer-to-innermost layer bridging.

In addition, though not illustrated in the figures, the second sub-winding 41U2 of the U-phase winding is also wound around the stator core 30 so as to be received in the U-phase slots U1 and U2 of the stator core 30 in the same manner as the first sub-winding 41U1.

In the present embodiment, all the winding sections A1-F1 and A2-F2 of the first and second sub-windings 41U1 and 41U2 of the U-phase winding are classified into three winding section groups. The first winding section group consists of the winding sections A1, A2, E1 and E2, each of which is arranged alternately at the first and second layers in the U-phase slots U1 or U2. The second winding section group consists of the winding sections B1, B2, F1 and F2, each of which is arranged alternately at the third and fourth layers in the U-phase slots U1 or U2. The third winding section group consists of the winding sections C1, C2, D1 and D2, each of which is arranged alternately at the fifth and sixth layers in the corresponding U-phase slots U1 and U2. That is, all the winding sections A1-F1 and A2-F2 of the first and second sub-windings 41U1 and 41U2 of the U-phase winding are classified, according to the arrangement positions in the U-phase slots U1 and U2, into N winding section groups, where N is a natural number not less than 2, and is equal to 3 in the present embodiment.

Moreover, each of the winding sections A1, A2, B1, B2, E1, E2, F1 and F2 of the first and second winding section groups (i.e., (N−1) winding section groups with N being equal to 3) is connected only in series with the other winding sections in the sub-winding 41U1 or 41U2. Further, as described previously, the winding sections A1, A2, B1, B2, E1, E2, F1 and F2 of the first and second winding section groups are equally arranged in the U-phase slots U1 and the U-phase slots U2. In other words, the in-slot portions of the winding sections A1, A2, B1, B2, E1, E2, F1 and F2 are equally distributed to the U-phase slots U1 and the U-phase slots U2.

On the other hand, each of the winding sections C1, C2, D1 and D2 of the third winding section group (i.e., the remaining one winding section group) is connected in series and in parallel with the other winding sections in the sub-winding 41U1 or 41U2. Further, as described previously, each of the winding sections C1, C2, D1 and D2 of the third winding section group is equally arranged in the U-phase slots U1 and the U-phase slots U2. In other words, for each of the winding sections C1, C2, D1 and D2, the in-slot portions of the winding section are equally distributed to the U-phase slots U1 and the U-phase slots U2.

Accordingly, in the present embodiment, each of the first and second sub-windings 41U1 and 41U2 of the U-phase winding is equally arranged in the U-phase slots U1 and the U-phase slots U2. In other words, for each of the first and second sub-windings 41U1 and 41U2, the in-slot portions of the sub-winding are equally distributed to the U-phase slots U1 and the U-phase slots U2.

The above-described stator coil 40 of the stator 20 according to the present embodiment has the characteristics of 5T between 6T and 4T. For example, in the case of the U-phase winding, as shown in FIG. 28, all the electric currents respectively flowing in the first and second winding sections A1, A2, B1 and B2 of the first and second sub-windings 41U1 and 41U2 are equal to A/2; all the electric currents respectively flowing in the first halves C1-1, C2-1, D1-1 and D2-1 of the fourth and fifth winding sections C1, C2, D1 and D2 of the first and second sub-windings 41U1 and 41U2 are equal to A/4; all the electric currents respectively flowing in the fifth and sixth winding sections E1, E2, F1 and F2 of the first and second sub-windings 41U1 and 41U2 are equal to A/2; and all the electric currents respectively flowing in the second halves C1-2, C2-2, D1-2 and D2-2 of the fourth and fifth winding sections C1, C2, D1 and D2 of the first and second sub-windings 41U1 and 41U2 are equal to A/4. Therefore, A'=8×(A/2)+4×(A/4)=5A; and T=5A/A=5. That is, the number T of turns of the U-phase winding is equal to 5.

The above-described stator 20 according to the present embodiment has the same advantages as the stator 20 according to the first embodiment.

In addition, as in the previously-described modification to the first embodiment, it is also possible to modify the stator coil 40 of the stator 20 according to the present embodiment so that: each of the winding sections A1, A2, B1, B2, E1, E2, F1 and F2 that are connected via only serial connection has a first cross-sectional area; each of the winding sections C1, C2, D1 and D2 that are connected via both serial connection and parallel connection has a second cross-sectional area; and the second cross-sectional area is set to be substantially half the first cross-sectional area.

Fifth Embodiment

This embodiment illustrates a stator 20 which has almost the same configuration as the stator 20 according to the first embodiment; accordingly, only the differences therebetween will be described hereinafter.

In the first embodiment, the stator coil 40 of the stator 20 is configured to have the characteristics of 3T between 4T and 2T.

In comparison, in the present embodiment, the stator coil 40 of the stator 20 is configured to have the characteristics of 7T (i.e., kT with k being equal to 7) between 8T and 6T.

Figure 29:
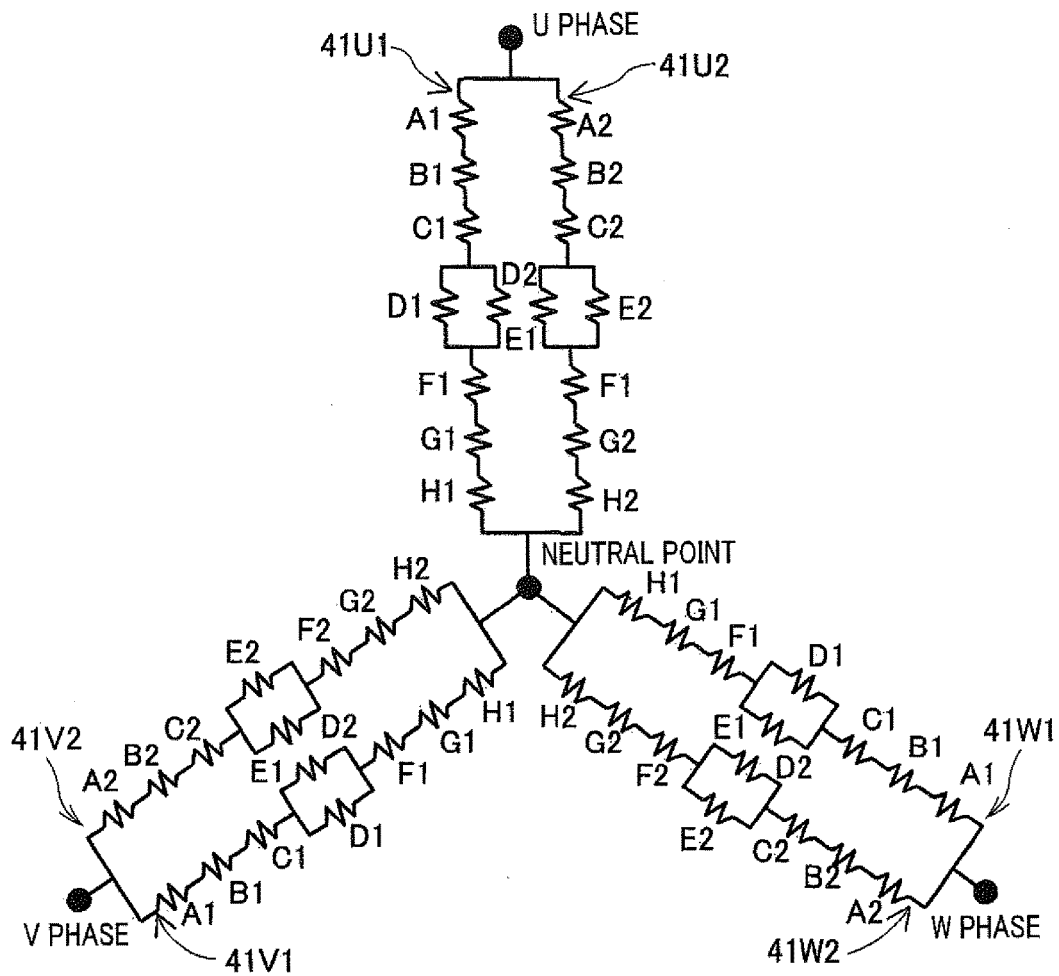
FIG. 29 is a schematic connection diagram of a stator coil of a stator according to a fifth embodiment.

Specifically, in the present embodiment, as shown in FIG. 29, the stator coil 40 is comprised of U-phase, V-phase and W-phase windings that are Y-connected. Further, each of the U-phase, V-phase and W-phase windings is comprised of a pair of sub-windings that are connected parallel to each other.

More specifically, the U-phase winding is comprised of first and second sub-windings 41U1 and 41U2 that are connected parallel to each other. The V-phase winding is comprised of first and second sub-windings 41V1 and 41V2 that are connected parallel to each other. The W-phase winding is comprised of first and second sub-windings 41W1 and 41W2 that are connected parallel to each other.

In addition, the U-phase, V-phase and W-phase windings have the same configuration and differ from each other only in electrical phase. Therefore, for the sake of avoiding redundancy, only the U-phase winding will be described in detail hereinafter.

Figure 30:
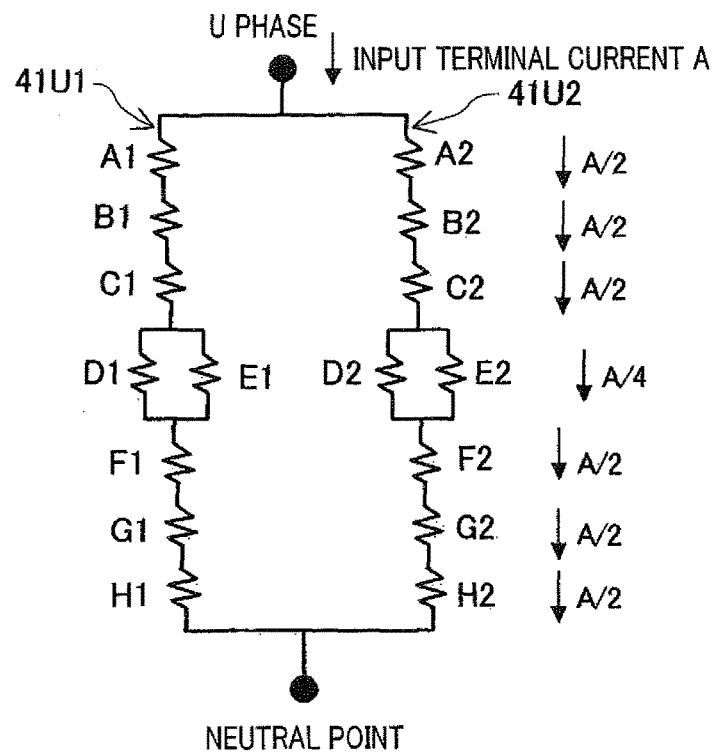
FIG. 30 is an enlarged view of a part of FIG. 29 which represents a U-phase winding of the stator coil.

As shown in FIG. 30, each of the first and second sub-windings 41U1 and 41U2 of the U-phase winding includes first to eighth winding sections. Moreover, the fourth and fifth winding sections are connected parallel to each other. The first to the third winding sections are arranged upstream of and serially connected to the parallel connection of the fourth and fifth winding sections. The sixth to the eighth winding sections are arranged downstream of and serially connected to the parallel connection of the fourth and fifth winding sections.

More specifically, the first sub-winding 41U1 includes the first to the eighth winding sections A1, B1, C1, D1, E1, F1, G1 and H1. The first to the third winding sections A1-C1 are arranged upstream of and serially connected to the parallel connection of the fourth and fifth winding sections D1 and E1. The sixth to the eighth winding sections F1-H1 are arranged downstream of and serially connected to the parallel connection of the fourth and fifth winding sections D1 and E1. Similarly, the second sub-winding 41U2 includes the first to the eighth winding sections A2, B2, C2, D2, E2, F2, G2 and 112. The first to the third winding sections A2-C2 are arranged upstream of and serially connected to the parallel connection of the fourth and fifth winding sections D2 and E2. The sixth to the eighth winding sections F2-H2 are arranged downstream of and serially connected to the parallel connection of the fourth and fifth winding sections D2 and E2.

Figure 31:
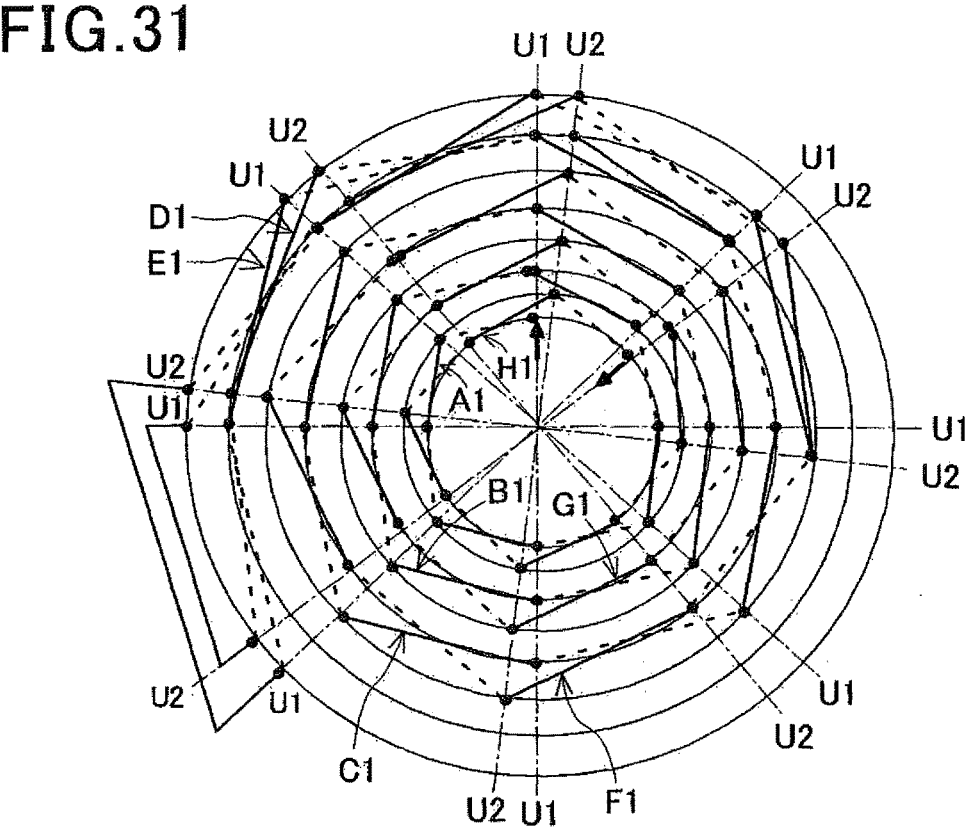
FIG. 31 is a schematic diagram illustrating all the positions of in-slot portions of a first sub-winding of the U-phase winding in the stator according to the fifth embodiment, the in-slot portions being received in corresponding slots of a stator core of the stator.

FIG. 31 illustrates all the positions of the in-slot portions of the first sub-winding 41U1 of the U-phase winding. As described in the first embodiment, the in-slot portions of the first sub-winding 41U1 are received in the U-phase slots U1 and U2 of the stator core 30. In addition, as in FIG. 6 described in the first embodiment, in FIG. 31, the connections between the in-slot portions on the first coil end part 40a side are shown with continuous lines; and the connections between the in-slot portions on the second coil end part 40b side are shown with dashed lines.

Figure 32:
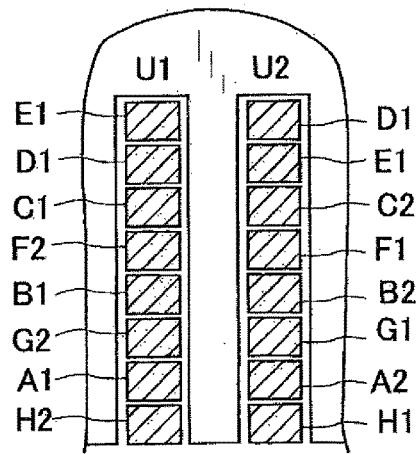
FIG. 32 is a schematic cross-sectional view of part of the stator according to the fifth embodiment, the part including a pair of U-phase slots of the stator core of the stator.

In the present embodiment, as shown in FIG. 32, the in-slot portions of the stator coil 40 are radially stacked in eight (i.e., 2×N with N being equal to 4) layers in each of the slots 31 of the stator core 30. Hereinafter, for the sake of convenience of explanation, the eight layers will be sequentially referred to as the first, second, third, fourth, fifth, sixth, seventh and eighth layers from the side of the radially inner periphery of the stator core 30. Moreover, for each of the first to the eighth winding sections A1-H1 of the first sub-winding 41U1, the in-slot portions of the winding section will be sequentially referred to as the first in-slot portion, the second in-slot portion, and so on from the winding start end to the winding finish end of the winding section.

As shown in FIG. 31, the first winding section A1 of the first sub-winding 41U1 has eight in-slot portions. The first in-slot portion is arranged at the first layer in the U-phase slot U1 at the position of twelve o'clock. The second in-slot portion is arranged at the second layer in the U-phase slot U1 that is separated counterclockwise by six slots from the U-phase slot U1 in which the previous (i.e., the first) in-slot portion is received. The third to the eight in-slot portions are arranged alternately at the first and second layers in the U-phase slots U1 that are successively separated counterclockwise by six slots from the respective U-phase slots U1 in which the previous in-slot portions are received. Consequently, the eighth in-slot portion is arranged at the second layer in the U-phase slot U1 at the position of half past one o'clock.

The second winding section B1 of the first sub-winding 41U1 also has eight in-slot portions. The first in-slot portion is arranged at the third layer in the U-phase slot U1 that is separated counterclockwise by six slots from the U-phase slot U1 at the position of half past one o'clock. In addition, the first in-slot portion of the second winding section B1 is connected to the eighth in-slot portion of the first winding section A1 which is arranged at the second layer in the U-phase slot U1 at the position of half past one o'clock. The second to the eighth in-slot portions of the second winding section B1 are arranged alternately at the fourth and third layers in the U-phase slots U1 that are successively separated counterclockwise by six slots from the respective U-phase slots U1 in which the previous in-slot portions are received. Consequently, the eighth in-slot portion is arranged at the fourth layer in the U-phase slot U1 at the position of half past one o'clock.

The third winding section C1 of the first sub-winding 41U1 also has eight in-slot portions. The first in-slot portion is arranged at the fifth layer in the U-phase slot U1 that is separated counterclockwise by six slots from the U-phase slot U1 at the position of half past one o'clock. In addition, the first in-slot portion of the third winding section C1 is connected to the eighth in-slot portion of the second winding section B1 which is arranged at the fourth layer in the U-phase slot U1 at the position of half past one o'clock. The second to the eighth in-slot portions of the third winding section C1 are arranged alternately at the sixth and fifth layers in the U-phase slots U1 that are successively separated counterclockwise by six slots from the respective U-phase slots U1 in which the previous in-slot portions are received. Consequently, the eighth in-slot portion is arranged at the sixth layer in the U-phase slot U1 at the position of half past one o'clock.

The fourth winding section D1 of the first sub-winding 41U1 also has eight in-slot portions. The first in-slot portion is arranged at the seventh layer in the U-phase slot U2 that is separated counterclockwise by five slots from the U-phase slot U1 at the position of half past one o'clock. In addition, the first in-slot portion of the fourth winding section D1 is connected to the eighth in-slot portion of the third winding section C1 which is arranged at the sixth layer in the U-phase slot U1 at the position of half past one o'clock. The second to the fourth in-slot portions of the fourth winding section D1 are arranged alternately at the eighth and seventh layers in the U-phase slots U2 that are successively separated counterclockwise by six slots from the respective U-phase slots U2 in which the previous in-slot portions are received. Consequently, the fourth in-slot portion is arranged at the eighth layer in the U-phase slot U2 at the position of half past seven o'clock. Further, the fifth in-slot portion is arranged at the eighth layer in the U-phase slot U1 that is separated clockwise by five slots from the U-phase slot U2 at the position of half past seven o'clock. That is, the bridging (or connection) between the fourth and fifth in-slot portions is an outermost layer-to-outermost layer bridging. The sixth to the eighth in-slot portions are arranged alternately at the seventh and eighth layers in the U-phase slots U1 that are successively separated clockwise by sixth slots from the respective U-phase slots U1 in which the previous in-slot portions are received. Consequently, the eighth in-slot portion is arranged at the seventh layer in the U-phase slot U1 at the position of half past one o'clock.

The fifth winding section E1 of the first sub-winding 41U1 also has eight in-slot portions. The first in-slot portion is arranged at the seventh layer in the U-phase slot U1 that is separated counterclockwise by six slots from the U-phase slot U1 at the position of half past one o'clock. In addition, the first in-slot portion of the fifth winding section E1 is also connected to the eighth in-slot portion of the third winding section C1 which is arranged at the sixth layer in the U-phase slot U1 at the position of half past one o'clock. The second to the fourth in-slot portions of the fifth winding section E1 are arranged alternately at the eighth and seventh layers in the U-phase slots U1 that are successively separated counterclockwise by six slots from the respective U-phase slots U1 in which the previous in-slot portions are received. Consequently, the fourth in-slot portion is arranged at the eighth layer in the U-phase slot U1 at the position of half past seven o'clock. Further, the fifth in-slot portion is arranged at the eighth layer in the U-phase slot U2 that is separated clockwise by seven slots from the U-phase slot U1 at the position of half past seven o'clock. That is, the bridging (or connection) between the fourth and fifth in-slot portions is an outermost layer-to-outermost layer bridging. The sixth to the eighth in-slot portions are arranged alternately at the seventh and eighth layers in the U-phase slots U2 that are successively separated clockwise by sixth slots from the respective U-phase slots U2 in which the previous in-slot portions are received. Consequently, the eighth in-slot portion is arranged at the seventh layer in the U-phase slot U2 at the position of half past one o'clock.

The sixth winding section F1 of the first sub-winding 41U1 also has eight in-slot portions. The first in-slot portion is arranged at the sixth layer in the U-phase slot U2 at the position of three o'clock. In addition, the first in-slot portion of the sixth winding section F1 is connected to both the eighth in-slot portion of the fourth winding section D1 which is arranged at the seventh layer in the U-phase slot U1 at the position of half past one o'clock and the eighth in-slot portion of the fifth winding section E1 which is arranged at the seventh layer in the U-phase slot U2 at the position of half past one o'clock. The second in-slot portion of the sixth winding section F1 is arranged at the fifth layer in the U-phase slot U2 that is separated clockwise by six slots from the U-phase slot U2 in which the previous (i.e., the first) in-slot portion is received. The third to the eighth in-slot portions are arranged alternately at the sixth and fifth layers in the U-phase slots U2 that are successively separated clockwise by six slots from the respective U-phase slots U2 in which the previous in-slot portions are received. Consequently, the eighth in-slot portion is arranged at the fifth layer in the U-phase slot U2 at the position of half past one o'clock.

The seventh winding section G1 of the first sub-winding 41U1 also has eight in-slot portions. The first in-slot portion is arranged at the fourth layer in the U-phase slot U2 that is separated clockwise by six slots from the U-phase slot U2 at the position of half past one o'clock. In addition, the first in-slot portion of the seventh winding section G1 is connected to the eighth in-slot portion of the sixth winding section F1 which is arranged at the fifth layer in the U-phase slot U2 at the position of half past one o'clock. The second to the eighth in-slot portions of the seventh winding section G1 are arranged alternately at the third and fourth layers in the U-phase slots U2 that are successively separated clockwise by six slots from the respective U-phase slots U2 in which the previous in-slot portions are received. Consequently, the eighth in-slot portion is arranged at the third layer in the U-phase slot U2 at the position of half past one o'clock.

The eighth winding section H1 of the first sub-winding 41U1 also has eight in-slot portions. The first in-slot portion is arranged at the second layer in the U-phase slot U2 that is separated clockwise by six slots from the U-phase slot U2 at the position of half past one o'clock. In addition, the first in-slot portion of the eighth winding section H1 is connected to the eighth in-slot portion of the seventh winding section G1 which is arranged at the third layer in the U-phase slot U2 at the position of half past one o'clock. The second to the eighth in-slot portions of the eighth winding section H1 are arranged alternately at the first and second layers in the U-phase slots U2 that are successively separated clockwise by six slots from the respective U-phase slots U2 in which the previous in-slot portions are received. Consequently, the eighth in-slot portion is arranged at the first layer in the U-phase slot U2 at the position of half past one o'clock.

The first sub-winding 41U1 of the U-phase winding is wound around the stator core 30 so as to be received in the U-phase slots U1 and U2 of the stator core 30 in the above-described manner. That is, in the present embodiment, the first sub-winding 41U1 is configured to be wound back from the counterclockwise direction to the clockwise direction at the longitudinal centers of the fourth and fifth winding sections D1 and E1 via the outermost layer-to-outermost layer bridging.

In addition, though not illustrated in the figures, the second sub-winding 41U2 of the U-phase winding is also wound around the stator core 30 so as to be received in the U-phase slots U1 and U2 of the stator core 30 in the same manner as the first sub-winding 41U1.

FIG. 32 illustrates an example of the arrangement of the in-slot portions of the U-phase winding in the U-phase slots U1 and U2 of the stator core 30. The pair of U-phase slots U1 and U2 shown in FIG. 32 is located at the position of half past ten o'clock in FIG. 31. As shown in FIG. 32, the first winding section A1 of the first sub-winding 41U1 is arranged at the second layer in the U-phase slot U1, while the first winding section A2 of the second sub-winding 41U2 is arranged at the second layer in the U-phase slot U2; the second winding section B1 of the first sub-winding 41U1 is arranged at the fourth layer in the U-phase slot U1, while the second winding section B2 of the second sub-winding 41U2 is arranged at the fourth layer in the U-phase slot U2; the third winding section C1 of the first sub-winding 41U1 is arranged at the sixth layer in the U-phase slot U1, while the third winding section C2 of the second sub-winding 41U2 is arranged at the sixth layer in the U-phase slot U2; the sixth winding section F1 of the first sub-winding 41U1 is arranged at the fifth layer in the U-phase slot U2, while the sixth winding section F2 of the second sub-winding 41U2 is arranged at the fifth layer in the U-phase slot U1; the seventh winding section G1 of the first sub-winding 41U1 is arranged at the third layer in the U-phase slot U2, while the seventh winding section G2 of the second sub-winding 41U2 is arranged at the third layer in the U-phase slot U1; and the eighth winding section H1 of the first sub-winding 41U1 is arranged at the first layer in the U-phase slot U2, while the eighth winding section H2 of the second sub-winding 41U2 is arranged at the first layer in the U-phase slot U1.

In the present embodiment, all the winding sections A1-H1 and A2-H2 of the first and second sub-windings 41U1 and 41U2 of the U-phase winding are classified into four winding section groups. The first winding section group consists of the winding sections A1, A2, H1 and H2, each of which is arranged alternately at the first and second layers in the U-phase slots U1 or U2. The second winding section group consists of the winding sections B1, B2, G1 and G2, each of which is arranged alternately at the third and fourth layers in the U-phase slots U1 or U2. The third winding section group consists of the winding sections C1, C2, F1 and F2, each of which is arranged alternately at the fifth and sixth layers in the U-phase slots U1 or U2. The fourth winding section group consists of the winding sections D1, D2, E1 and E2, each of which is arranged alternately at the seventh and eighth layers in the corresponding U-phase slots U1 and U2. That is, all the winding sections A1-H1 and A2-H2 of the first and second sub-windings 41U1 and 41U2 of the U-phase winding are classified, according to the arrangement positions in the U-phase slots U1 and U2, into N winding section groups, where N is a natural number not less than 2 and equal to 4 in the present embodiment.

Moreover, each of the winding sections A1, A2, B1, B2, C1, C2, F1, F2, G1, G2, H1 and H2 of the first, second and third winding section groups (i.e., (N−1) winding section groups with N being equal to 4) is connected only in series with the other winding sections in the sub-winding 41U1 or 41U2. Further, as described previously with reference to FIG. 31, the winding sections A1-C1, A2-C2, F1-H1 and F2-H2 of the first, second and third winding section groups are equally arranged in the U-phase slots U1 and the U-phase slots U2. In other words, the in-slot portions of the winding sections A1-C1, A2-C2, F1-H1 and F2-H2 are equally distributed to the U-phase slots U1 and the U-phase slots U2.

On the other hand, each of the winding sections D1, D2, E1 and E2 of the fourth winding section group (i.e., the remaining one winding section group) is connected in series and in parallel with the other winding sections in the sub-winding 41U1 or 41U2. Further, as described previously with reference to FIG. 31, each of the winding sections D1, D2, E1 and E2 of the fourth winding section group is equally arranged in the U-phase slots U1 and the U-phase slots U2. In other words, for each of the winding sections D1, D2, E1 and E2, the in-slot portions of the winding section are equally distributed to the U-phase slots U1 and the U-phase slots U2.

Accordingly, in the present embodiment, each of the first and second sub-windings 41U1 and 41U2 of the U-phase winding is equally arranged in the U-phase slots U1 and the U-phase slots U2. In other words, for each of the first and second sub-windings 41U1 and 41U2, the in-slot portions of the sub-winding are equally distributed to the U-phase slots U1 and the U-phase slots U2.

The above-described stator coil 40 of the stator 20 according to the present embodiment has the characteristics of 7T between 8T and 6T. For example, in the case of the U-phase winding, as shown in FIG. 30, all the electric currents respectively flowing in the first to the third winding sections A1-C1 and A2-C2 of the first and second sub-windings 41U1 and 41U2 are equal to A/2; all the electric currents respectively flowing in the fourth and fifth winding sections D1, D2, E1 and E2 of the first and second sub-windings 41U1 and 41U2 are equal to A/4; and all the electric currents respectively flowing in the sixth to the eighth winding sections F1-H1 and F2-H2 of the first and second sub-windings 41U1 and 41U2 are equal to A/2. Therefore, A′=12×(A/2)+4×(A/4)=7A; and T=7A/A=7. That is, the number T of turns of the U-phase winding is equal to 7.

The above-described stator 20 according to the present embodiment has the same advantages as the stator 20 according to the first embodiment.

In addition, as in the previously-described modification to the first embodiment, it is also possible to modify the stator coil 40 of the stator 20 according to the present embodiment so that: each of the winding sections A1-C1, A2-C2, F1-H1 and F2-H2 that are connected via only serial connection has a first cross-sectional area; each of the winding sections D1, D2, E1 and E2 that are connected via both serial connection and parallel connection has a second cross-sectional area; and the second cross-sectional area is set to be substantially half the first cross-sectional area.

Sixth Embodiment

This embodiment illustrates a stator 20 which has almost the same configuration as the stator 20 according to the fifth embodiment; accordingly, only the differences therebetween will be described hereinafter.

In the present embodiment, the stator coil 40 also has the characteristics of 7T between 8T and 6T as in the fifth embodiment.

However, the stator coil 40 in the present embodiment is of an outermost layer-to-innermost layer bridging type, whereas the stator coil 40 in the fifth embodiment is of the outermost layer-to-outermost layer bridging type as described previously.

Figure 33:
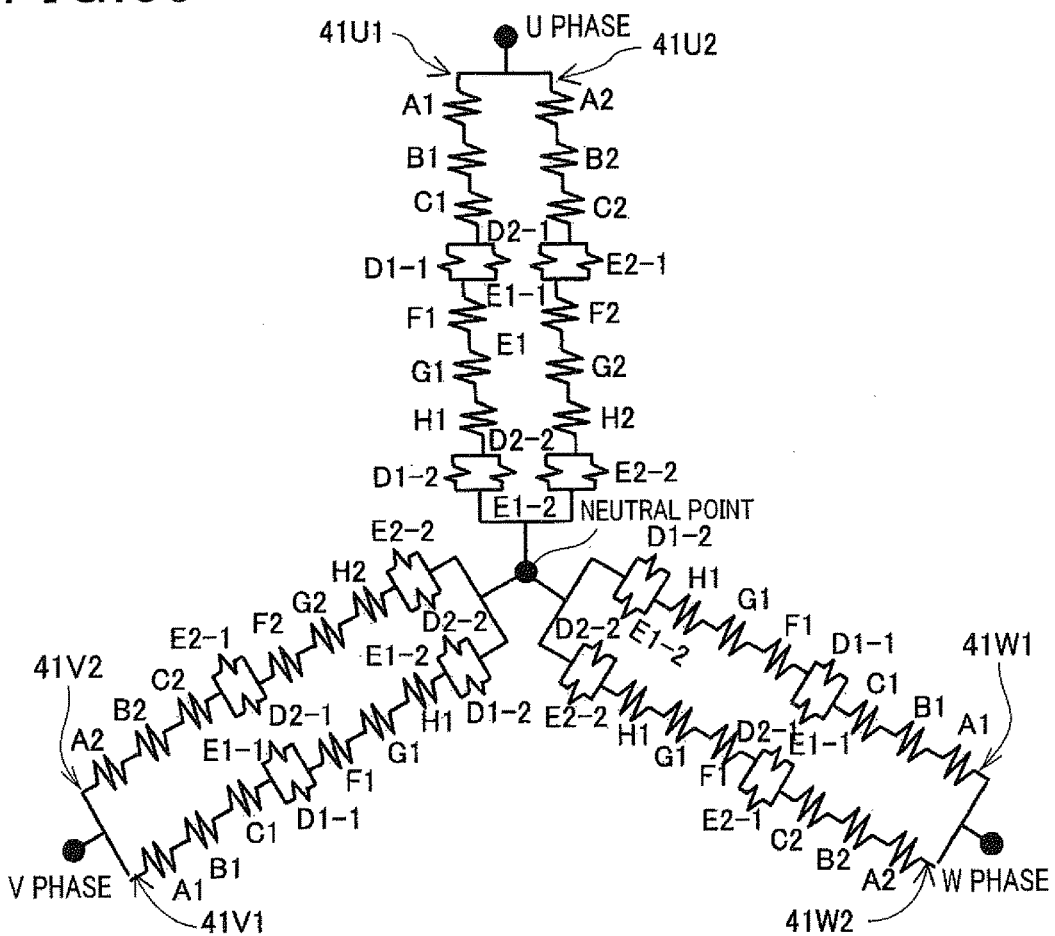
FIG. 33 is a schematic connection diagram of a stator coil of a stator according to a sixth embodiment.

Specifically, in the present embodiment, as shown in FIG. 33, the stator coil 40 is comprised of U-phase, V-phase and W-phase windings that are Y-connected. Further, each of the U-phase, V-phase and W-phase windings is comprised of a pair of sub-windings that are connected parallel to each other.

More specifically, the U-phase winding is comprised of first and second sub-windings 41U1 and 41U2 that are connected parallel to each other. The V-phase winding is comprised of first and second sub-windings 41V1 and 41V2 that are connected parallel to each other. The W-phase winding is comprised of first and second sub-windings 41W1 and 41W2 that are connected parallel to each other.

In addition, the U-phase, V-phase and W-phase windings have the same configuration and differ from each other only in electrical phase. Therefore, for the sake of avoiding redundancy, only the U-phase winding will be described in detail hereinafter.

Figure 34:
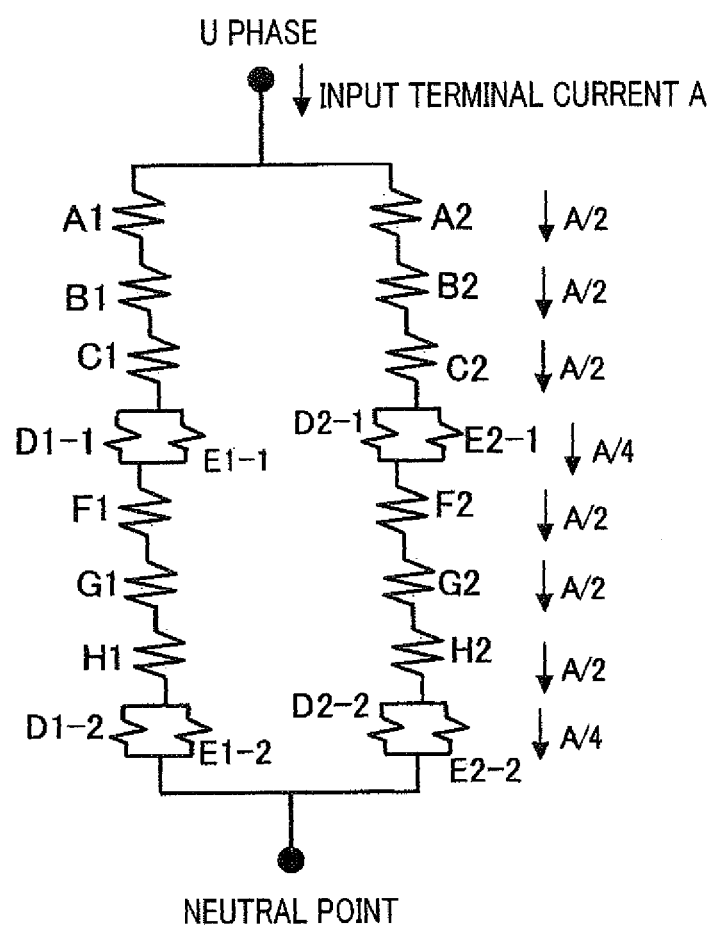
FIG. 34 is an enlarged view of a part of FIG. 33 which represents a U-phase winding of the stator coil.

As shown in FIG. 34, each of the first and second sub-windings 41U1 and 41U2 of the U-phase winding includes first to eighth winding sections. Moreover, each of the fourth and fifth winding sections is bisected in its longitudinal direction into first and second halves. The first halves of the fourth and fifth winding sections are connected parallel to each other. The second halves of the fourth and fifth winding sections are also connected parallel to each other. The parallel connection of the first halves of the fourth and fifth winding sections is arranged downstream of and serially connected to the first to the third winding sections, and arranged upstream of and serially connected to the sixth to the eighth winding sections. The parallel connection of the second halves of the fourth and fifth winding sections is arranged downstream of and serially connected to the sixth to the eighth winding sections.

More specifically, the first sub-winding 41U1 includes the first to the eighth winding sections A1, B1, C1, D1, E1, F1, G1 and H1. The parallel connection of the first halves D1-1 and E1-1 of the fourth and fifth winding sections D1 and E1 is arranged downstream of and serially connected to the first to the third winding sections A1-C1, and arranged upstream of and serially connected to the sixth to the eighth winding sections F1-H1. The parallel connection of the second halves D1-2 and E1-2 of the fourth and fifth winding sections D1 and E1 is arranged downstream of and serially connected to the sixth to the eighth winding sections F1-H1. Similarly, the second sub-winding 41U2 includes the first to the eighth winding sections A2, B2, C2, D2, E2, F2, G2 and H2. The parallel connection of the first halves D2-1 and E2-1 of the fourth and fifth winding sections D2 and E2 is arranged downstream of and serially connected to the first to the third winding sections A2-C2, and arranged upstream of and serially connected to the sixth to the eighth winding sections F2-H2. The parallel connection of the second halves D2-2 and E2-2 of the fourth and fifth winding sections D2 and E2 is arranged downstream of and serially connected to the sixth to the eighth winding sections F2-H2.

Though not shown in the figures, in the present embodiment, the in-slot portions of the stator coil 40 are radially stacked in eight (i.e., 2×N with N being equal to 4) layers in each of the slots 31 of the stator core 30. Hereinafter, for the sake of convenience of explanation, the eight layers will be sequentially referred to as the first, second, third, fourth, fifth, sixth, seventh and eighth layers from the side of the radially inner periphery of the stator core 30. Moreover, for each of the first to the eighth winding sections A1-H1 of the first sub-winding 41U1, the in-slot portions of the winding section will be sequentially referred to as the first in-slot portion, the second in-slot portion, . . . , and so on from the winding start end to the winding finish end of the winding section.

In the present embodiment, the first sub-winding 41U1 of the U-phase winding is wound around the stator core 30 in a manner that is a combination of those manners described in the second and fifth embodiments.

Specifically, in the present embodiment, though not shown in the is figures, the first winding section A1 of the first sub-winding 41U1 has eight in-slot portions. The first to the eighth in-slot portions of the first winding section A1 are alternately arranged at the first and second layers in the U-phase slots U1.

The second winding section B1 of the first sub-winding 41U1 also has eight in-slot portions. The first to the eighth in-slot portions of the second winding section B1 are arranged alternately at the third and fourth layers in the U-phase slots U1.

The third winding section C1 of the first sub-winding 41U1 also has eight in-slot portions. The first to the eighth in-slot portions of the third winding section C1 are arranged alternately at the fifth and sixth layers in the U-phase slots U1.

The first half D1-1 of the fourth winding section D1 has four in-slot portions. The first to the fourth in-slot portions of the first half D1-1 of the fourth winding section D1 are arranged alternately at the seventh and eighth layers in the corresponding U-phase slots U2.

The first half E1-1 of the fifth winding section E1 also has four in-slot portions. The first to the fourth in-slot portions of the first half E1-1 of the fifth winding section E1 are arranged alternately at the seventh and eighth layers in the corresponding U-phase slots U1.

The sixth winding section F1 of the first sub-winding 41U1 has eight in-slot portions. The first to the eighth in-slot portions of the sixth winding section F1 are arranged alternately at the first and second layers in the U-phase slots U2.

In addition, each of the fourth in-slot portions of the first halves D1-1 and E1-1 of the fourth and fifth winding sections D1 and E1 is connected to the first in-slot portion of the sixth winding section F1 via an outermost layer-to-innermost layer bridging (i.e., eighth layer-to-first layer bridging).

The seventh winding section G1 of the first sub-winding 41U1 also has eight in-slot portions. The first to the eighth in-slot portions of the seventh winding section G1 are arranged alternately at the third and fourth layers in the U-phase slots U2.

The eighth winding section H1 of the first sub-winding 41U1 also has eight in-slot portions. The first to the eighth in-slot portions of the eighth winding section H1 are arranged alternately at the fifth and sixth layers in the U-phase slots U2.

The second half D1-2 of the fourth winding section D1 has four in-slot portions. The first to the fourth in-slot portions of the second half D1-2 of the fourth winding section D1 are arranged alternately at the seventh and eighth layers in the corresponding U-phase slots U1.

The second half E1-2 of the fifth winding section E1 also has four in-slot portions. The first to the fourth in-slot portions of the second half E1-2 of the fifth winding section E1 are arranged alternately at the seventh and eighth layers in the corresponding U-phase slots U2.

The first sub-winding 41U1 of the U-phase winding is wound around the stator core 30 so as to be received in the U-phase slots U1 and U2 of the stator core 30 in the above-described manner. That is, in the present embodiment, the first sub-winding 41U1 is configured to connect each of the first halves D1-1 and E1-1 of the fourth and fifth winding sections D1 and E1 to the sixth winding section F1 via the outermost layer-to-innermost layer bridging.

In addition, though not illustrated in the figures, the second sub-winding 41U2 of the U-phase winding is also wound around the stator core 30 so as to be received in the U-phase slots U1 and U2 of the stator core 30 in the same manner as the first sub-winding 41U1.

In the present embodiment, all the winding sections A1-H1 and A2-H2 of the first and second sub-windings 41U1 and 41U2 of the U-phase winding are classified into four winding section groups. The first winding section group consists of the winding sections A1, A2, F1 and F2, each of which is arranged alternately at the first and second layers in the U-phase slots U1 or U2. The second winding section group consists of the winding sections B1, B2, G1 and G2, each of which is arranged alternately at the third and fourth layers in the U-phase slots U1 or U2. The third winding section group consists of the winding sections C1, C2, H1 and H2, each of which is arranged alternately at the fifth and sixth layers in the U-phase slots U1 or U2. The fourth winding section group consists of the winding sections D1, D2, E1 and E2, each of which is arranged alternately at the seventh and eighth layers in the corresponding U-phase slots U1 and U2. That is, all the winding sections A1-H1 and A2-H2 of the first and second sub-windings 41U1 and 41U2 of the U-phase winding are classified, according to the arrangement positions in the U-phase slots U1 and U2, into N winding section groups, where N is a natural number not less than 2, and is equal to 4 in the present embodiment.

Moreover, each of the winding sections A1-C1, A2-C2, F1-H1 and F2-H2 of the first to the third winding section groups (i.e., (N−1) winding section groups with N being equal to 4) is connected only in series with the other winding sections in the sub-winding 41U1 or 41U2. Further, as described previously, the winding sections A1-C1, A2-C2, F1-H1 and F2-H2 of the first to the third winding section groups are equally arranged in the U-phase slots U1 and the U-phase slots U2. In other words, the in-slot portions of the winding sections A1-C1, A2-C2, F1-H1 and F2-H2 are equally distributed to the U-phase slots U1 and the U-phase slots U2.

On the other hand, each of the winding sections D1, D2, E1 and E2 of the fourth winding section group (i.e., the remaining one winding section group) is connected in series and in parallel with the other winding sections in the sub-winding 41U1 or 41U2. Further, as described previously, each of the winding sections D1, D2, E1 and E2 of the fourth winding section group is equally arranged in the U-phase slots U1 and the U-phase slots U2. In other words, for each of the winding sections D1, D2, E1 and E2, the in-slot portions of the winding section are equally distributed to the U-phase slots U1 and the U-phase slots U2.

Accordingly, in the present embodiment, each of the first and second sub-windings 41U1 and 41U2 of the U-phase winding is equally arranged in the U-phase slots U1 and the U-phase slots U2. In other words, for each of the first and second sub-windings 41U1 and 41U2, the in-slot portions of the sub-winding are equally distributed to the U-phase slots U1 and the U-phase slots U2.

The above-described stator coil 40 of the stator 20 according to the present embodiment has the characteristics of 7T between 8T and 6T. For example, in the case of the U-phase winding, as shown in FIG. 34, all the electric currents respectively flowing in the first to the third winding sections A1-C1 and A2-C2 of the first and second sub-windings 41U1 and 41U2 are equal to A/2; all the electric currents respectively flowing in the first halves D1-1, D2-1, E1-1 and E2-1 of the fourth and fifth winding sections D1, D2, E1 and E2 of the first and second sub-windings 41U1 and 41U2 are equal to A/4; all the electric currents respectively flowing in the sixth to the eighth winding sections F1-H1 and F2-H2 of the first and second sub-windings 41U1 and 41U2 are equal to A/2; and all the electric currents respectively flowing in the second halves D1-2, D2-2, E1-2 and E2-2 of the fourth and fifth winding sections D1, D2, E1 and E2 of the first and second sub-windings 41U1 and 41U2 are equal to A/4. Therefore, A'=12×(A/2)+4×(A/4)=7A; and T=7A/A=7. That is, the number T of turns of the U-phase winding is equal to 7.

The above-described stator 20 according to the present embodiment has the same advantages as the stator 20 according to the first embodiment.

In addition, as in the previously-described modification to the first embodiment, it is also possible to modify the stator coil 40 of the stator 20 according to the present embodiment so that: each of the winding sections A1-C1, A2-C2, F1-H1 and F2-H2 that are connected via only serial connection has a first cross-sectional area; each of the winding sections D1, D2, E1 and E2 that are connected via both serial connection and parallel connection has a second cross-sectional area; and the second cross-sectional area is set to be substantially half the first cross-sectional area.

While the above particular embodiments and their modifications have been shown and described, it will be understood by those skilled in the art that various further modifications, changes and improvements may be made without departing from the spirit of the present invention.

For example, in the previous embodiments, the present invention is directed to the stators 20 for the rotating electric machine 1 which is configured as an electric motor. However, the present invention can also be applied to stators for other rotating electric machines, such as a stator for an electric generator and a stator for a motor-generator that selectively functions either as an electric motor or as an electric generator.

What is claimed is:

1. A stator for a rotating electric machine, the stator comprising:
   an annular stator core having a plurality of pairs of first-phase slots, a plurality of pairs of second-phase slots and a plurality of pairs of third-phase slots that are sequentially and repeatedly provided in a circumferential direction of the stator core; and
   a stator coil comprised of a first-phase winding, a second-phase winding and a third-phase winding that are mounted on the stator core so as to be respectively received in the pairs of first-phase slots, the pairs of second-phase slots and the pairs of third-phase slots, the first-phase, second-phase and third-phase windings being Y-connected with each other,
   wherein
   in each of the first-phase, second-phase and third-phase slots of the stator core, there are received 2×N in-slot portions of a corresponding one of the first-phase, second-phase and third-phase windings of the stator coil in radial alignment with each other, where N is a natural number not less than 2,
   each of the first-phase, second-phase and third-phase windings of the stator coil is comprised of a pair of sub-windings that are connected parallel to each other,
   each of the sub-windings is comprised of a plurality of winding sections,
   the winding sections are classified into N winding section groups including a first winding section group and a second winding section group, each of the winding sections of the first winding section group being arranged alternately at first and second layers in the corresponding phase slots of the stator core, each of the winding sections of the second winding section group being arranged alternately at third and fourth layers in the corresponding phase slots of the stator core, and
   among the N winding section groups, each of the winding sections of (N−1) winding section groups is connected via only serial connection in the sub-winding, and each of the winding sections of the remaining one winding section group is connected via both serial connection and parallel connection in the sub-winding.

2. The stator as set forth in claim 1, wherein each of those winding sections which are connected via only serial connection in the sub-winding has a first cross-sectional area,
   each of those winding sections which are connected via both serial connection and parallel connection in the sub-winding has a second cross-sectional area, and
   the second cross-sectional area is substantially half the first cross-sectional area.

3. The stator as set forth in claim 1, wherein each of the pairs of first-phase slots consists of a first first-phase slot and a second first-phase slot,
   each of the pairs of second-phase slots consists of a first second-phase slot and a second second-phase slot,
   each of the pairs of third-phase slots consists of a first third-phase slot and a second third-phase slot,
   each of the sub-windings of the first-phase winding is equally arranged in the first first-phase slots and the second first-phase slots,
   each of the sub-windings of the second-phase winding is equally arranged in the first second-phase slots and the second second-phase slots, and each of the sub-windings of the third-phase winding is equally arranged in the first third-phase slots and the second third-phase slots.

4. The stator as set forth in claim 3, wherein each of those winding sections of the sub-windings of the first-phase winding which are connected via both serial connection and parallel connection is equally arranged in the first first-phase slots and the second first-phase slots, each of those winding sections of the sub-windings of the second-phase winding which are connected via both serial connection and parallel connection is equally arranged in the first second-phase slots and the second second-phase slots, and each of those winding sections of the sub-windings of the third-phase winding which are connected via both serial connection and parallel connection is equally arranged in the first third-phase slots and the second third-phase slots.

\* \* \* \* \*